United States Patent
Sato

(10) Patent No.: US 7,791,762 B2
(45) Date of Patent: Sep. 7, 2010

(54) IMAGE FORMING APPARATUS AND IMAGE FORMING SYSTEM

(75) Inventor: Junji Sato, Tokyo (JP)

(73) Assignee: Oki Data Corporation, Tokyo (JP)

(*) Notice: Subject to any disclaimer, the term of this patent is extended or adjusted under 35 U.S.C. 154(b) by 609 days.

(21) Appl. No.: 11/688,889

(22) Filed: Mar. 21, 2007

(65) Prior Publication Data
US 2007/0223038 A1    Sep. 27, 2007

(30) Foreign Application Priority Data

Mar. 24, 2006  (JP)  ............... 2006-083537
Mar. 1, 2007   (JP)  ............... 2007-051718

(51) Int. Cl.
H04N 1/60    (2006.01)
H04N 1/46    (2006.01)
G06K 15/00   (2006.01)
G06F 3/12    (2006.01)
G03G 21/00   (2006.01)

(52) U.S. Cl. .............. 358/1.9; 358/3.28; 358/1.12; 358/1.13; 358/1.14; 358/540; 399/366

(58) Field of Classification Search .............. 358/540, 358/3.28, 1.13, 1.14, 1.12, 1.11, 1.9; 399/81, 399/366, 15, 10, 36, 49, 60, 72
See application file for complete search history.

(56) References Cited

U.S. PATENT DOCUMENTS 7,149,451 B2 * 12/2006 Uchida et al. ............... 399/81
7,509,060 B2 *  3/2009 Yaguchi et al. ............. 399/15

FOREIGN PATENT DOCUMENTS

JP    11-298717 A    10/1999

* cited by examiner

*Primary Examiner*—Charlotte M Baker
(74) *Attorney, Agent, or Firm*—Panitch Schwarze Belisario & Nadel LLP

(57) ABSTRACT

An image forming apparatus and an image forming system of the invention have: a discriminating section which discriminates necessity of a security pattern for suppressing illegal use of image creation data on the basis of a security level; a security pattern forming section which forms security pattern data on the basis of attribute data when it is determined that the security pattern is necessary; and an image forming section which forms the security pattern onto a record medium together with an image on the basis of the formed security pattern data. A consumption amount of a coloring agent which is consumed when the security pattern to suppress the illegal use of the image creation data is formed can be reduced.

8 Claims, 27 Drawing Sheets

FIG.2

| DOCUMENT SUBJECT | DOCUMENT CONTENTS | SECURITY RANK |
|---|---|---|
| BUSINESS PLAN | DOCUMENT DATA 1 | middle |
| PATENT PLAN | DOCUMENT DATA 2 | high |
| GREETING | DOCUMENT DATA3 | low |
| . . . | . . . | . . . |

| SECURITY LEVEL | NECESSITY DISCRIMINATION |
|---|---|
| high | ON |
| middle | ON |
| low | OFF |

| DOCUMENT SUBJECT | DOCUMENT CONTENTS | DOCUMENT PROPRIETOR | DOCUMENT FILE NAME | SECURITY RANK |
|---|---|---|---|---|
| BUSINESS PLAN | DOCUMENT DATA 1 | BUSINESS PLAN SECTION | businessplan | middle |
| PATENT PLAN | DOCUMENT DATA 2 | INTELLECTUAL PROPERTY RIGHTS SECTION | patentplan | high |
| GREETING | DOCUMENT DATA 3 | GENERAL AFFAIRS SECTION | greetingplan | low |
| . | . | . | . | COPY PROHIBITION |
| . | . | . | . | middle |
| . | . | . | . | none |

FIG. 7

| SECURITY LEVEL | NECESSITY DISCRIMINATION | ATTRIBUTE DESIGNATION RANGE | | | | | |
|---|---|---|---|---|---|---|---|
| | | USER NAME | TERMINAL CONNECTION ADDRESS | DOCUMENT SUBJECT | PROPRIETOR | FILE NAME | COPY PROHIBITION |
| high | PATTERN 1 | Yes | Yes | Yes | Yes | Yes | No |
| middle | PATTERN 2 | Yes | No | Yes | Yes | No | No |
| low | PATTERN 3 | Yes | No | Yes | No | No | No |
| COPY PROHIBITION | PATTERN 4 | No | No | No | No | No | Yes |
| none | OFF | | | | | | |

FIG.10

| SECURITY LEVEL | NECESSITY DISCRIMINATION | PRINT CONCENTRATION |
|---|---|---|
| high | ON | 100% |
| middle | ON | 70% |
| low | ON | 30% |
| COPY PROHIBITION | ON | 50% |
| none | OFF | |

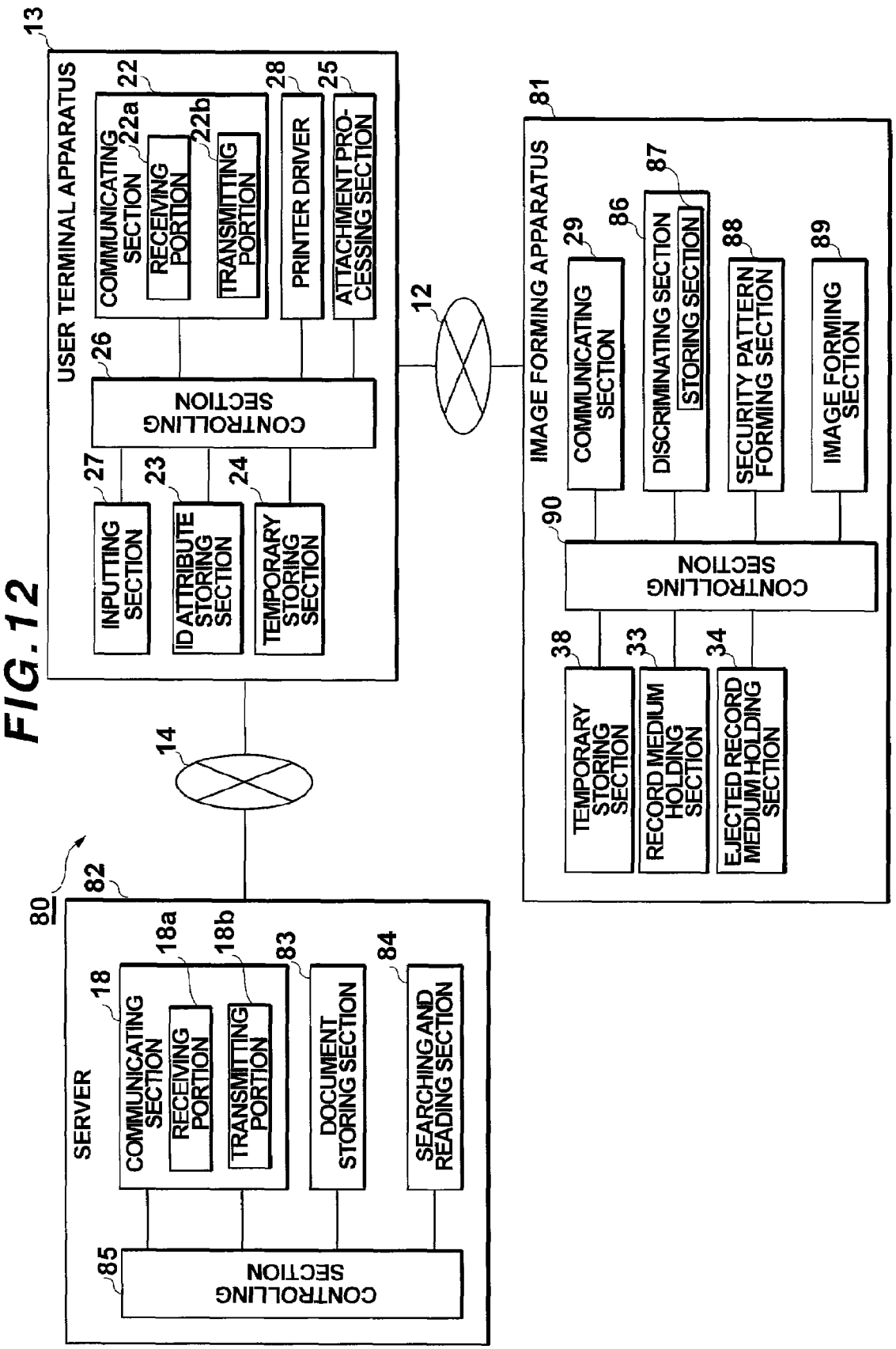

FIG. 13

| DOCUMENT SUBJECT | DOCUMENT CONTENTS | DOCUMENT PROPRIETOR | DOCUMENT FILE NAME | APPLICATION (SECURITY RANK) |
|---|---|---|---|---|
| BUSINESS PLAN | DOCUMENT DATA 1 | BUSINESS PLAN SECTION | businessplan | Public System |
| PATENT PLAN | DOCUMENT DATA 2 | INTELLECTUAL PROPERTY RIGHTS SECTION | patentplan | Word Processor |
| GREETING | DOCUMENT DATA 3 | GENERAL AFFAIRS SECTION | greetingplan | Text Editor |
| . | . | . | . | Image Viewer |
| . | . | . | . | Excel |
| . | . | . | . |  |

FIG.14

| APPLICATION (SECURITY LEVEL) | NECESSITY DISCRIMINATION | PRINT CONCENTRATION |
|---|---|---|
| Word Processor | PATTERN 1 | 100% |
| Public System | PATTERN 2 | 70% |
| Text Editor | PATTERN 3 | 30% |
| Image Viewer | PATTERN 4 | 50% |
| . . . | . . . | |
| Excel | OFF | |

FIG. 16

| SECURITY LEVEL | PRIORITY | NECESSITY DISCRIMINATION | ... |
|---|---|---|---|
| high | 1 | PATTERN 1 | ... |
| middle | 3 | PATTERN 3 | ... |
| low | 5 | PATTERN 5 | ... |
| Word Processor | 2 | PATTERN 2 | ... |
| Image Viewer | 4 | PATTERN 4 | ... |
| ... | ... | ... | ... |

FIG. 17

| SECURITY LEVEL | NECESSITY DISCRIMINATION |
|---|---|
| high | PATTERN 1 |
| middle | PATTERN 2 |
| low | PATTERN 3 |
| none | OFF |

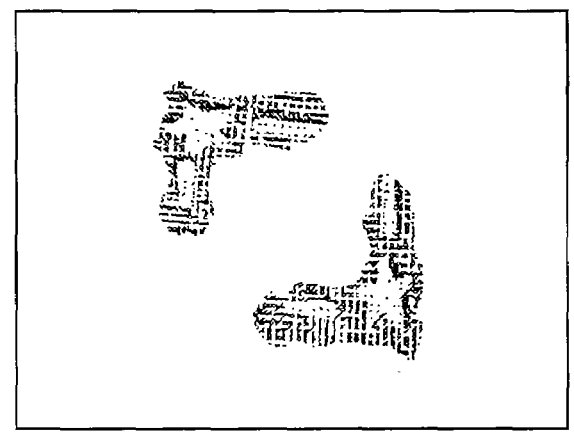
FIG.18C 20%
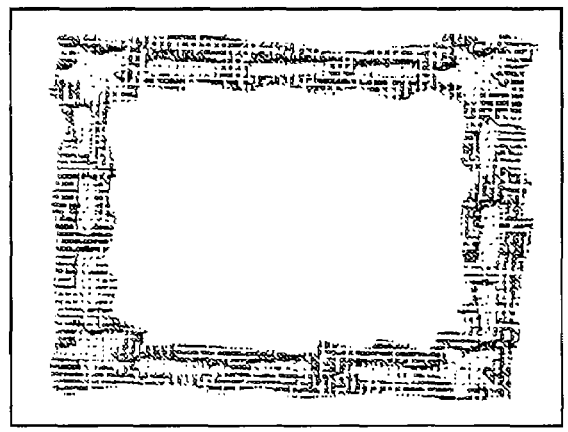
FIG.18B 50%
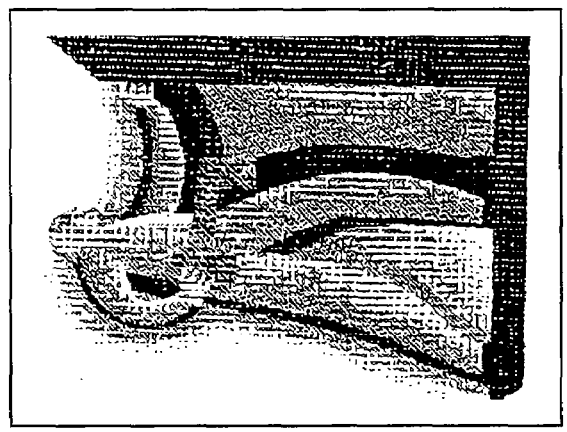
FIG.18A DOT DENSITY 85%

FIG.20

| SECURITY LEVEL | NECESSITY DISCRIMINATION |
|---|---|
| high | PATTERN 1 |
| middle | PATTERN 2 |
| low | PATTERN 3 |
| none | OFF |

FIG.24

| DOCUMENT SUBJECT | DOCUMENT CONTENTS | DOCUMENT PROPRIETOR | DOCUMENT FILE NAME |
|---|---|---|---|
| BUSINESS PLAN | DOCUMENT DATA 1 | BUSINESS PLAN SECTION | businessplan |
| PATENT PLAN | DOCUMENT DATA 2 | INTELLECTUAL PROPERTY RIGHTS SECTION | patentplan |
| GREETING | DOCUMENT DATA 3 | GENERAL AFFAIRS SECTION | greetingplan |
| . | . | . | . |
| . | . | . | . |
| . | . | . | . |

FIG.25

| SECURITY LEVEL | ATTRIBUTE DESIGNATION RANGE | | | | | | | PRINT CONCENTRATION |
|---|---|---|---|---|---|---|---|---|
| | USER NAME | TERMINAL CONNECTION ADDRESS | DOCUMENT SUBJECT | PROPRIETOR | FILE NAME | COPY PROHIBITION | | |
| High | Yes | Yes | Yes | Yes | Yes | No | | 90% |
| Middle | Yes | No | Yes | Yes | No | No | | 75% |
| Low | Yes | No | Yes | No | No | No | | 50% |
| Copy Prohibition | No | No | No | No | No | Yes | | 25% |

FIG.27A

Security Pattern Set

ON ▮

OFF

FIG.27B

Security Level

High ▮

Middle

Low

Copy Prohibition

[ Cancel ]

IMAGE FORMING APPARATUS AND IMAGE FORMING SYSTEM

BACKGROUND OF THE INVENTION

1. Field of the Invention

The invention relates to an image forming apparatus and an image forming system in which a woven pattern is formed on a record medium together with image creation data and, more particularly, to an image forming apparatus and an image forming system in which a coloring agent that is used for image creation is properly consumed.

2. Description of the Related Arts

In an image forming system having a user terminal, a document server for storing documents to be printed, and an image forming apparatus such as a printer for receiving print data (that is, image creation data) of document contents transmitted through the user terminal and printing, the image forming apparatus prints the print data onto a sheet as a record medium by using, for example, toner or ink as a coloring agent.

For the printed sheet, in order to suppress a copy, forgery, leakage of security, or the like of the print data, together with the print data, the following pattern is printed as a security pattern (i.e. a woven pattern) to suppress an illegal use onto the whole surface of the sheet as a background of the print data: a hidden pattern based on a character image such as "Copy Prohibition"; a watermark based on character information such as "Company Secret"; a leakage suppression pattern based on information including the user and the like; or the like.

Such a security pattern has been disclosed in, for example, JP-A-1999(Heisei 11)-298717.

However, the coloring agent is consumed in order to print the security pattern. Particularly, in the conventional image forming system, since the image forming apparatus uniformly prints the security pattern to all print documents which are stored into the document server, a large amount of coloring agent is consumed.

SUMMARY OF THE INVENTION

It is an object of the invention to provide an image forming apparatus and an image forming system a security pattern is formed on a record medium together with image creation data, wherein a coloring agent that is used for image creation is properly consumed.

According to the present invention, there is provided an image forming apparatus for overlaying security pattern data to document data received from an host apparatus and printing, comprising a storing section which stores a condition adapted to select the security pattern data to be overlaid and printed; a selecting section which selects the security pattern data on the basis of the condition when the document data is received from the host apparatus; and a print controlling section which overlays the selected data and the document data to print.

Further, according to the present invention, there is also provided an image forming system having an host apparatus for transmitting document data and an image forming apparatus for overlaying security pattern data to the document data received from the host apparatus and printing, comprising a storing section which stores a condition adapted to select the security pattern data to be overlaid and printed; a selecting section which selects the security pattern data on the basis of the condition; and a print controlling section which overlays the selected security pattern data and the document data and prints.

According to the image forming apparatus and the image forming system of the invention, since the security pattern for suppression of an illegal use of the image creation data or the like is formed together with the print data onto the record medium only when it is necessary, a consumption amount of the coloring agent which is used for the image creation can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is an explanatory diagram showing a construction of a document storing section in the embodiment 1;

FIG. 3 is an explanatory diagram showing a construction of a security pattern necessity discrimination table in the embodiment 1;

FIG. 6 is an explanatory diagram showing a construction of a document storing section in the embodiment 2;

FIG. 7 is an explanatory diagram showing a construction of a security pattern necessity discrimination table in the embodiment 2;

FIG. 10 is an explanatory diagram showing a construction of a security pattern necessity discrimination table in the embodiment 3;

FIG. 12 is a block diagram showing a construction in an embodiment 4 of an image forming system according to the invention;

FIG. 13 is an explanatory diagram showing a construction of a document storing section in the embodiment 4;

FIG. 14 is an explanatory diagram showing a construction of a security pattern necessity discrimination table in the embodiment 4;

FIG. 16 is an explanatory diagram showing a construction of a security pattern necessity discrimination table in a modification example of the embodiment 4 of the image forming system according to the invention;

FIG. 17 is an explanatory diagram showing a construction of a security pattern necessity discrimination table in a modification example of the embodiment 3;

FIGS. 18A to 18C are explanatory diagrams showing basic patterns corresponding to security patterns in the modification example of the embodiment 3;

FIG. 20 is an explanatory diagram showing a construction of a security pattern necessity discrimination table in the embodiment 5;

FIG. 24 is an explanatory diagram showing a construction of a document storing section in the embodiment 6;

FIG. 25 is an explanatory diagram showing a construction of a data table to form a security pattern in the embodiment 6;

FIGS. 27A and 27B are explanatory diagrams showing a setting inquiry display screen of a security level in the embodiment 6.

DETAILED DESCRIPTION OF THE PREFERRED EMBODIMENTS

An image forming system according to the invention will be described in detail hereinbelow together with an image forming apparatus with respect to embodiments with reference to the drawings.

Embodiment 1

<Construction of Embodiment 1>

Figure 1:
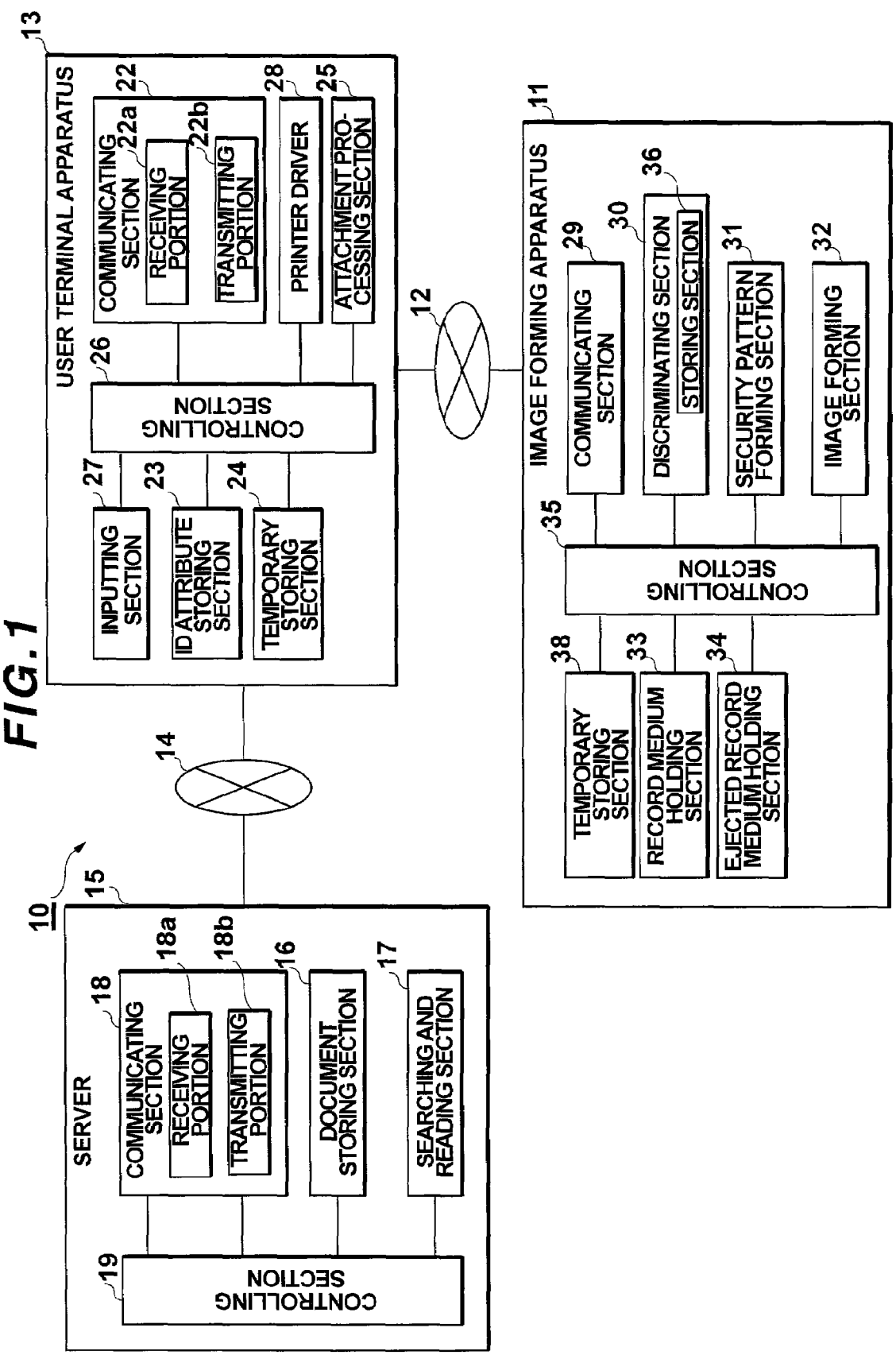
FIG. 1 is a block diagram showing a construction in an embodiment 1 of an image forming system according to the invention.

FIG. 1 is a block diagram showing a construction in an embodiment 1 of an image forming system according to the invention.

As shown in FIG. 1, an image forming system 10 according to the invention includes: an image forming apparatus 11; a user terminal 13 connected to the image forming apparatus 11 through a communication line 12 so that it can communicate with the image forming apparatus 11; and a server 15 connected to the user terminal 13 through a communication line 14 so that it can communicate with the user terminal 13.

The image forming system 10 is provided for, for example, facilities such as company, bank, or the like and used.

The server 15 has: a document storing section 16 for storing image creation data regarding, for example, each of documents having a security in the facilities; a searching and reading section 17 for searching the document storing section 16 and reading the image creation data; a communicating section 18 for communicating with the user terminal 13; and a controlling section 19 for controlling each of those sections.

The communicating section 18 has a receiving portion 18a and a transmitting portion 18b.

FIG. 2 is an explanatory diagram showing a construction of the document storing section in the embodiment 1.

Three items of "Document Subject", "Document Contents", and "Security Rank" are provided for the document storing section 16.

Subject data such as "Business Plan", "Patent Plan", and "Greeting", document data such as document data 1, document data 2, and document data 3, and security rank data such as "middle", "high", and "low" have been stored in correspondence to the respective items.

The document subject data is used as document attribute data showing attributes regarding the documents. The document data is used as image creation data of an image to be formed. The security rank data is used as a security level. In the security rank data, "high" indicates that the security is high, "middle" indicates that the security is normal, and "low" indicates that the security is low.

As an host apparatus of the image forming apparatus 11, the user terminal 13 has: a communicating section 22 for communicating with the server 15 and the image forming apparatus 11 and receiving, for example, the image creation data from the server; an identification (ID) attribute storing section 23 for storing identification (ID) attribute data showing identification (ID) attributes having the name of the user, a connection address of the terminal, and the like; a temporary storing section 24 for temporarily storing the received image creation data and the like; an attachment processing section 25 for attaching the ID attribute data to the image creation data; an inputting section 27 for allowing the apparatus to execute an input of the user; a printer driver 28 for converting the image creation data and the like received from the server into data which can be interpreted by the image forming apparatus 11; and a controlling section 26 for controlling each of the above sections.

The communicating section 22 has a receiving portion 22a and a transmitting portion 22b.

The image forming apparatus 11 has: a communicating section 29 for communicating with the user terminal 13 and receiving, for example, the image creation data of the image to be formed; a discriminating section 30 for discriminating whether or not a security pattern (i.e. a woven pattern) which is used for suppression of an illegal use of the image creation data or the like is necessary to be formed on a background of the received image creation data; a security pattern forming section 31 for forming security pattern data if it is determined by the discriminating section 30 that the security pattern is necessary; an image forming section 32 for forming an image and a security pattern by printing the image creation data and the security pattern data onto a sheet or the like; a record medium holding section 33 such as a tray for holding a record medium such as a sheet or the like; an ejected record medium holding section 34 for holding the record medium ejected after the image was formed thereon; a temporary storing section 38 for temporarily storing the received data; and a controlling section 35 for controlling each of the above sections.

The discriminating section 30 has a storing section 36. A security pattern necessity discrimination table which shows a relation between a security rank and the necessity of the security pattern and is used to discriminate about the necessity of the security pattern has been stored in the storing section 36.

FIG. 3 is an explanatory diagram showing a construction of the security pattern necessity discrimination table in the embodiment 1.

As shown in FIG. 3, two items of "Security Level" and "Necessity Discrimination" are provided in the security pattern necessity discrimination table. The security levels "high", "middle", "low", . . . , and the necessity data "ON"

and "OFF" have been stored in correspondence to each of the above items.

The security level is constructed by the security rank data.

<Operation of Embodiment 1>

The operation of the image forming system 10 according to the invention will now be described with reference to a flowchart together with the operation of the image forming apparatus according to the invention.

Figure 4:
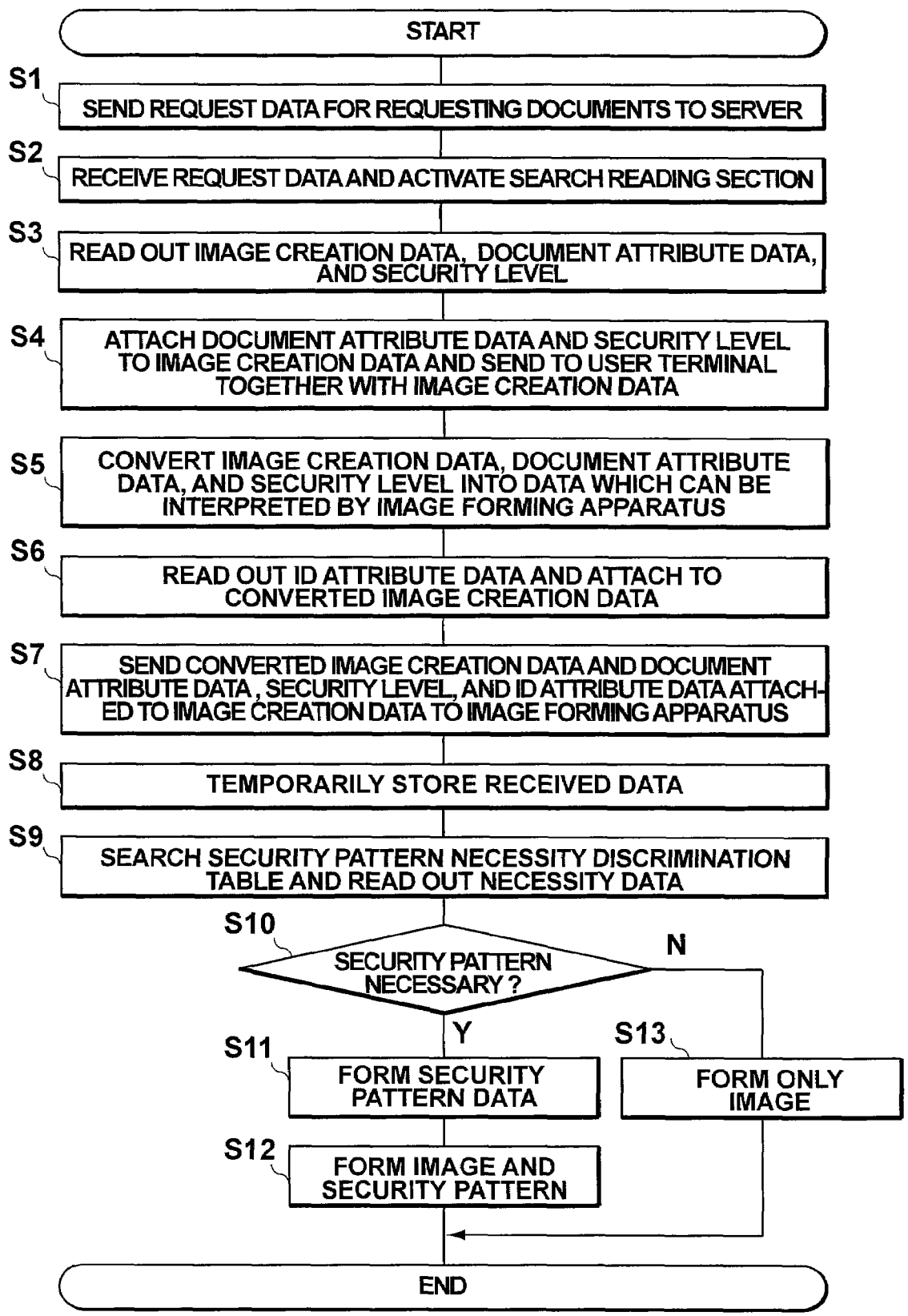
FIG. 4 is a flowchart showing the operation in the embodiment 1 of the image forming system according to the invention.

FIG. 4 is the flowchart showing the operation in the embodiment 1 of the image forming system according to the invention. First, in the user terminal 13, in response to the input performed by the user through the inputting section 27, the controlling section 26 executes the controlling operation for controlling the whole apparatus and instructs the transmitting portion 22b to transmit request data for requesting documents to the server 15 (step 1).

In the server 15, the controlling section 19 executes the controlling operation for controlling the whole apparatus, instructs the receiving portion 18a to receive the request data, and activates the searching and reading section 17 (step 2).

On the basis of a document keyword such as "Patent Plan" included in the request data, the searching and reading section 17 searches the "Document Subject" item in the document storing section 16 and reads out the document data 2 as image creation data, the subject data "Patent Plan" as document attribute data, and the security rank data "high" as a security level corresponding to those data (step 3).

The document attribute data and the security level are attached to the image creation data by the controlling section 19 and transmitted to the user terminal 13 by the transmitting portion 18b together with the image creation data (step 4).

In the user terminal 13, the image creation data, the document attribute data, and the security level which were received by the receiving portion 22a are temporarily stored into the temporary storing section 24. The printer driver 28 converts those data into the data which can be interpreted by the image forming apparatus 11 (step 5).

The attachment processing section 25 reads out the user name and the terminal connection address as ID attribute data stored in the ID attribute storing section 23 and attaches to the converted image creation data (step 6).

After that, the transmitting portion 22b transmits the converted image creation data and the document attribute data, the security level, and the ID attribute data attached to the image creation data to the image forming apparatus 11 (step 7).

In the image forming apparatus 11, the controlling section 35 executes the controlling operation for controlling the whole apparatus, instructs the communicating section 29 to receive those data, and instructs the temporary storing section 38 to store those data (step 8).

On the basis of the security level "high" included in those data, the discriminating section 30 searches the security pattern necessity discrimination table in the storing section 36 and reads out the relevant necessity data "ON" (step 9). Further, on the basis of the necessity data "ON", the discriminating section 30 determines that the security pattern is necessary (step 10).

If it is determined that the security pattern is necessary, the controlling section 35 activates the security pattern forming section 31. The activated security pattern forming section 31 forms the security pattern data by using the document attribute data and the ID attribute data (step 11). For example, the security pattern data may be data of a pattern including a character pattern such as "Not to be Taken out of the Company" or the like or data constructed only by the ID attribute data including the user name, terminal connection address, and the like.

The controlling section 35 conveys the sheet from the record medium holding section 33 to the image forming section 32 and activates the image forming section 32 (step 11). The activated image forming section 32 forms an image and a security pattern onto the sheet on the basis of the image creation data and the security pattern data by using a coloring agent such as toner or the like (step 12).

A security pattern of a dot pattern can be also formed by, for example, a Val-Code technique as a digital watermark technique on the basis of the security pattern data.

The controlling section 35 conveys the sheet on which the image and the security pattern have been formed to the ejected record medium holding section 34, holds it into the ejected record medium holding section 34, and finishes the processing routine.

If the discriminating section 30 determines in step 10 that the security pattern is unnecessary, the controlling section 35 directly activates the image forming section 32. The activated image forming section 32 forms only the image (step 13).

<Effects of Embodiment 1>

According to the embodiment 1 of the invention, since the security pattern for the suppression of the illegal use of the image creation data or the like is formed onto the record medium together with the image creation data only when the security pattern is necessary, a consumption amount of the coloring agent which is used for the image creation can be reduced.

Since the user name, terminal connection address, and the like are used as security pattern data and included in the security pattern and can be read out by a security pattern analysis reading apparatus, it is possible to enable the user to pay an attention more to prevention of the security leakage in association with the creation of the security pattern.

Embodiment 2

The embodiment 2 will now be described.

The same or similar component elements as those in the embodiment 1 are designated by the same reference numerals and their overlapped explanation is omitted here.

<Construction of Embodiment 2>

Figure 5:
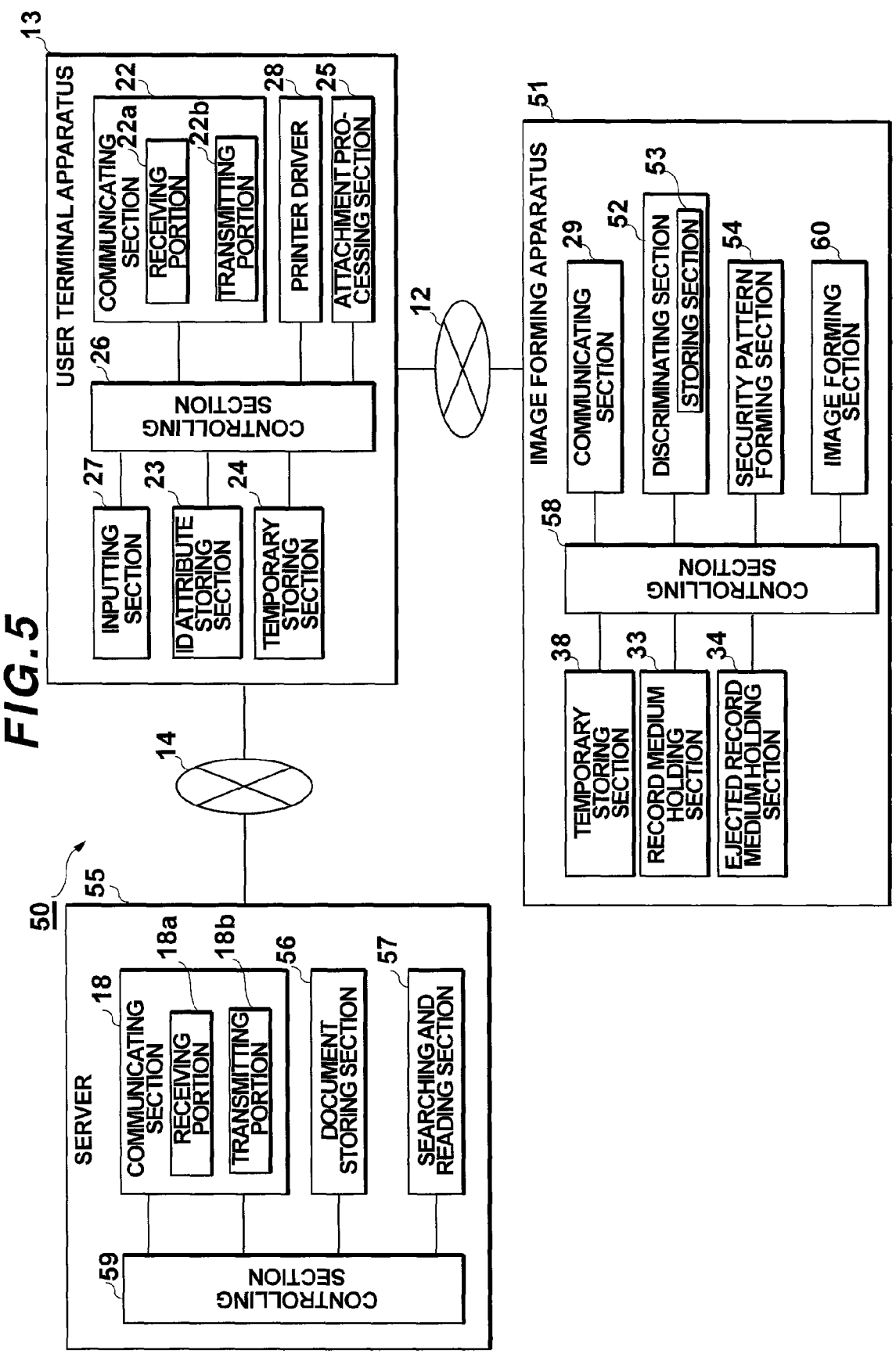
FIG. 5 is a block diagram showing a construction in an embodiment 2 of an image forming system according to the invention.

FIG. 5 is a block diagram showing a construction in the embodiment 2 of an image forming system according to the invention.

As shown in FIG. 5, an image forming system 50 according to the invention includes: an image forming apparatus 51; the user terminal 13 connected to the image forming apparatus 51 through the communication line 12 so that it can communicate with the image forming apparatus 51; and a server 55 connected to the user terminal 13 through the communication line 14 so that it can communicate with the user terminal 13.

The image forming system 50 is provided for, for example, facilities such as company, bank, or the like and used.

The server 55 has: a document storing section 56 for storing image creation data regarding, for example, each of documents having a security in the facilities; a searching and reading section 57 for searching the document storing section 56 and reading the image creation data; the communicating section 18 for communicating with the user terminal 13; and a controlling section 59 for controlling each of those sections.

The communicating section 18 has the receiving portion 18a and the transmitting portion 18b.

FIG. 6 is an explanatory diagram showing a construction of the document storing section in the embodiment 2.

Besides the items of "Document Subject", "Document Contents", and "Security Rank", two other items of "Document Proprietor" and "Document File Name" are additionally provided for the document storing section 56.

For example, "Business Plan Section", "Intellectual Property Rights Section", . . . , "businessplan", "patentplan", . . . , and the like have been stored as document attribute data showing the document attributes in correspondence to those items of "Document Proprietor" and "Document File Name".

For example, data constructed by "Copy Prohibition", "none", and the like is also used as security rank data.

As an host apparatus of the image forming apparatus 51, the user terminal 13 has: the communicating section 22 for communicating with the server 55 and the image forming apparatus 51 and receiving image creation data from the server 55; the identification (ID) attribute storing section 23 for storing identification (ID) attribute data showing identification (ID) attributes having the name of the user, the connection address of the terminal, and the like; the temporary storing section 24 for temporarily storing the received image creation data and the like; the attachment processing section 25 for attaching the ID attribute data to the image creation data; the inputting section 27 for allowing the apparatus to execute the input of the user; the printer driver 28 for converting the image creation data and the like received from the server into the data which can be interpreted by the image forming apparatus 51; and the controlling section 26 for controlling each of the above sections.

The communicating section 22 has the receiving portion 22a and the transmitting portion 22b.

The image forming apparatus 51 has: the communicating section 29 for communicating with the user terminal 13 and receiving the image creation data of the image to be formed; a discriminating section 52 for discriminating whether or not a security pattern which is used for suppression of an illegal use of the image creation data or the like is necessary to be formed on a background of the received image creation data; a security pattern forming section 54 for forming security pattern data if it is determined by the discriminating section 52 that the security pattern is necessary; an image forming section 60 for forming the image and the security pattern by printing the image creation data and the security pattern data onto the sheet or the like; the record medium holding section 33 such as a tray for holding the record medium such as a sheet or the like; the ejected record medium holding section 34 for holding the record medium ejected after the image was formed thereon; the temporary storing section 38 for temporarily storing the received data; and a controlling section 58 for controlling each of the above sections.

The discriminating section 52 has a storing section 53. A security pattern necessity discrimination table which shows a relation between the security rank and the necessity of the security pattern and is used to discriminate about the necessity of the security pattern has been stored in the storing section 53.

FIG. 7 is an explanatory diagram showing a construction of the security pattern necessity discrimination table in the embodiment 2.

As shown in FIG. 7, besides the two items of "Security Level" and "Necessity Discrimination", an item of "Attribute Designation Range" is additionally provided in the security pattern necessity discrimination table.

In correspondence to the item of "Security Level", two items of "Copy Prohibition" and "none" have additionally been stored.

In correspondence to the item of "Necessity Discrimination", "Pattern 1", "Pattern 2", and the like have been stored in place of "ON" in the embodiment 1.

Further, in correspondence to the item of "Attribute Designation Range", subitems of "User Name", "Terminal Connection Address", "Document Subject", "Document Proprietor", "Document File Name", and "Copy Prohibition" are provided. In correspondence to those subitems, "Yes" or "No" has been stored.

<Operation of Embodiment 2>

The operation of the image forming system 50 according to the invention will now be described with reference to a flowchart together with the operation of the image forming apparatus according to the invention.

Figure 8:
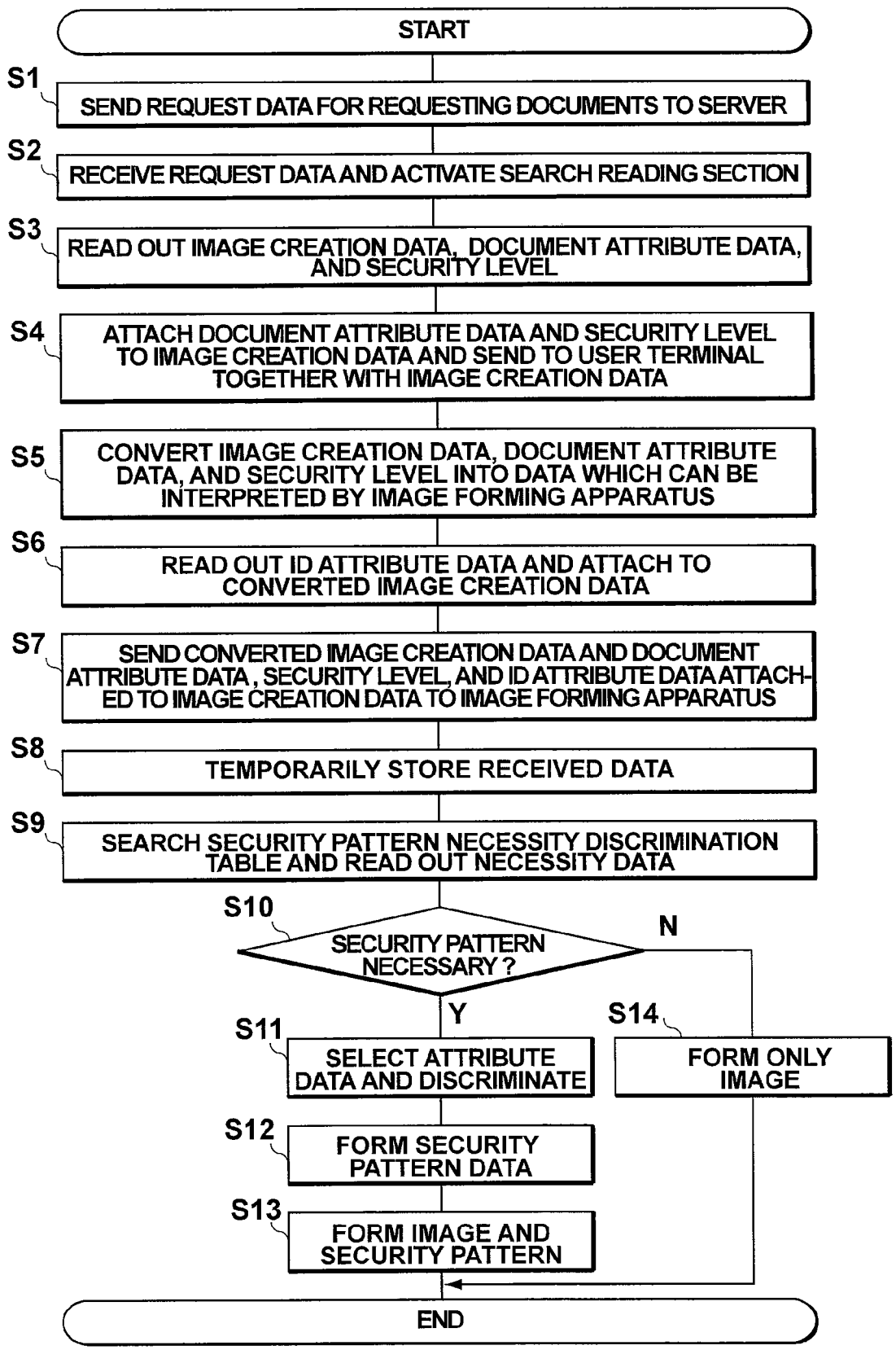
FIG. 8 is a flowchart showing the operation in the embodiment 2 of the image forming system according to the invention.

FIG. 8 is the flowchart showing the operation in the embodiment 2 of the image forming system according to the invention.

First, in the user terminal 13, in response to the input performed by the user through the inputting section 27, the controlling section 26 executes the controlling operation for controlling the whole apparatus and instructs the transmitting portion 22b to transmit request data for requesting the documents to the server 55 (step 1).

In the server 55, the controlling section 59 executes the controlling operation for controlling the whole apparatus, instructs the receiving portion 18a to receive the request data, and activates the searching and reading section 57 (step 2).

On the basis of the document keyword such as "Patent Plan" included in the request data, the searching and reading section 57 searches the "Document Subject" item in the document storing section 56 and reads out the document data 2 as image creation data, the subject data "Patent Plan", proprietor data "Intellectual Property Rights Section", and file name data "patentplan" as document attribute data, and the security rank data "high" indicative of the security level corresponding to those data (step 3).

The document attribute data and the security level are attached to the image creation data by the controlling section 59 and transmitted to the user terminal 13 by the transmitting portion 18b together with the image creation data (step 4).

In the user terminal 13, the image creation data, the document attribute data, and the security level which were received by the receiving portion 22a are temporarily stored into the temporary storing section 24. The printer driver 28 converts those data into the data which can be interpreted by the image forming apparatus 51 (step 5).

The attachment processing section 25 reads out the user name and the terminal connection address as ID attribute data stored in the ID attribute storing section 23 and attaches to the converted image creation data (step 6).

After that, the transmitting portion 22b transmits the converted image creation data and a plurality of document attribute data, security level, and ID attribute data attached to the image creation data to the image forming apparatus 51 (step 7).

The document attribute data and the ID attribute data are used as attribute data showing the attributes regarding the documents.

In the image forming apparatus 51, the controlling section 58 executes the controlling operation for controlling the whole apparatus, instructs the communicating section 29 to receive those data, and instructs the temporary storing section 38 to store those data (step 8).

On the basis of the security level "high" included in those data, the discriminating section 52 searches the security pattern necessity discrimination table in the storing section 53 and reads out the relevant necessity data "Pattern 1" (step 9). On the basis of the read-out necessity data "Pattern 1", the discriminating section 52 determines that the security pattern is necessary (step 10).

After it was determined that the security pattern is necessary, the discriminating section 52 further reads out the "Yes" data of each subitem in the item "Attribute Designation Range" in correspondence to the "Pattern 1" data, discriminates the attribute data to be used as security pattern data, and sends a discrimination result to the controlling section 58 (step 11).

The controlling section 58 which received the discrimination result activates the security pattern forming section 54. On the basis of the discrimination result, the activated security pattern forming section 54 selectively uses the document attribute data and the ID attribute data as attribute data, forms an encryption pattern from the selected data, and forms the security pattern data (step 12).

Although all attribute data is selected in correspondence to the pattern 1 in the embodiment, a part of the attribute data is selected in correspondence to another pattern.

The controlling section 58 conveys the sheet from the record medium holding section 33 to the image forming section 60 and activates the image forming section 60 (step 13). The activated image forming section 60 forms the image pattern and also forms the security pattern as a leakage suppression pattern onto the sheet by using the coloring agent such as toner or the like on the basis of the image creation data and the security pattern data (step 13).

The controlling section 58 conveys the sheet on which the image and the security pattern have been formed to the ejected record medium holding section 34, holds it into the ejected record medium holding section 34, and finishes the processing routine.

If the discriminating section 52 determines in step 10 that the security pattern is unnecessary, the controlling section 58 directly activates the image forming section 60. The activated image forming section 60 forms only the image (step 14).

If the security level indicates "Copy Prohibition", the discriminating section 52 determines that the data to be used as security pattern data is the "Copy Prohibition" data. The security pattern forming section 54 forms security pattern data on the basis of the "Copy Prohibition" data. The image forming section 60 forms a copy suppression hidden pattern for suppressing the copy of the image creation data.

<Effects of Embodiment 2>

According to the embodiment 2 of the invention, since the attribute data to be included in the security pattern is selected and designated in accordance with the security level, a security pattern information amount can be reduced. Thus, a dot amount per unit area decreases and the consumption amount of the coloring agent can be further reduced.

In the case of copy prohibition, since only the "Copy Prohibition" data is used as security pattern data, the consumption amount of the coloring agent can be reduced.

Embodiment 3

The embodiment 3 will now be described.

The same or similar component elements as those in the embodiments 1 and 2 are designated by the same reference numerals and their overlapped explanation is omitted here.

<Construction of Embodiment 3>

Figure 9:
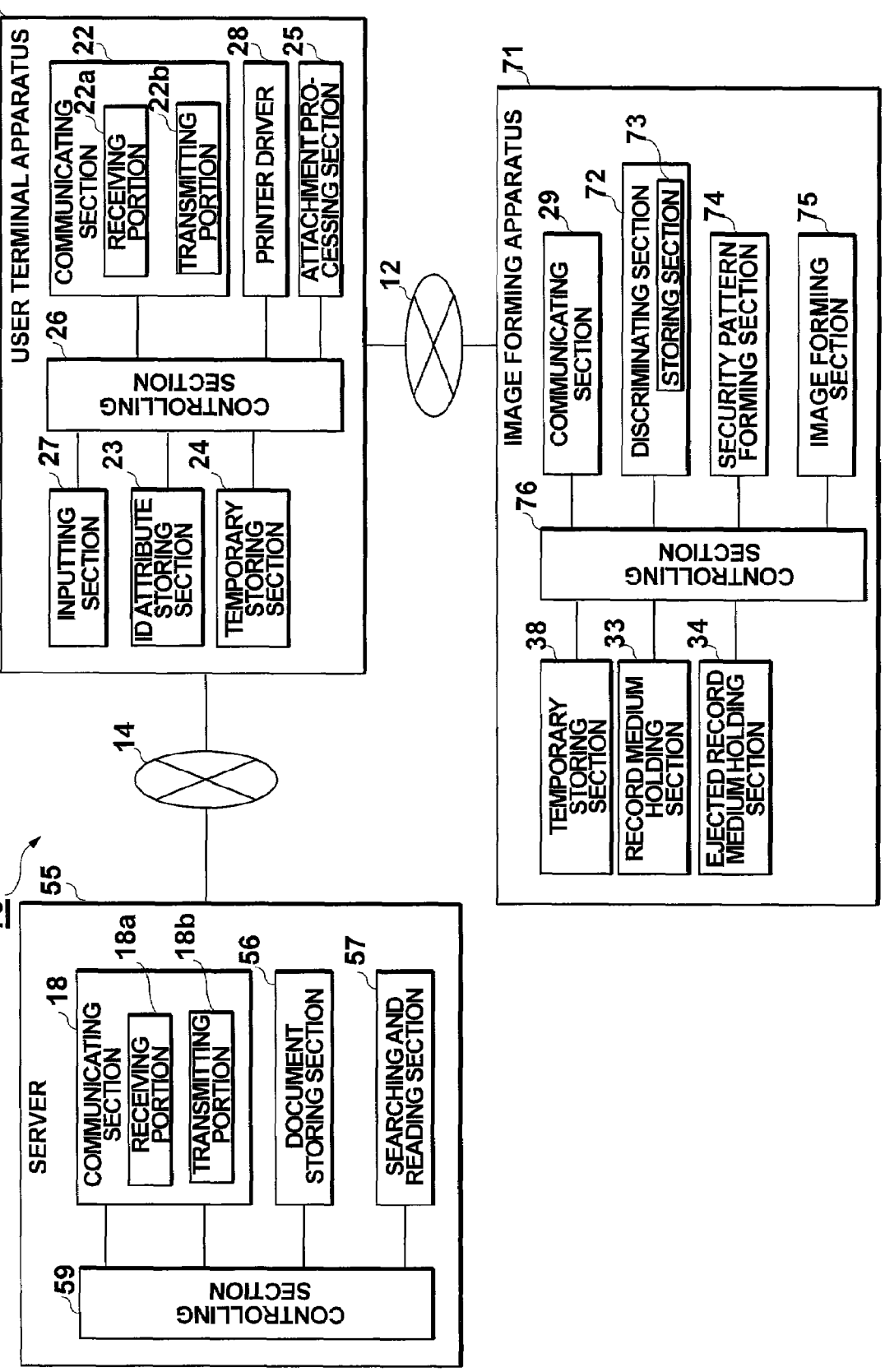
FIG. 9 is a block diagram showing a construction in an embodiment 3 of an image forming system according to the invention.

FIG. 9 is a block diagram showing a construction in the embodiment 3 of an image forming system according to the invention.

As shown in FIG. 9, an image forming system 70 according to the invention includes: an image forming apparatus 71; the user terminal 13 connected to the image forming apparatus 71 through the communication line 12 so that it can communicate with the image forming apparatus 71; and the server 55 connected to the user terminal 13 through the communication line 14 so that it can communicate with the user terminal 13.

The image forming system 70 is provided for, for example, facilities such as company, bank, or the like and used.

The server 55 has: the document storing section 56 for storing image creation data regarding, for example, each of documents having a security in the facilities; the searching and reading section 57 for searching the document storing section 56 and reading the image creation data; the communicating section 18 for communicating with the user terminal 13; and the controlling section 59 for controlling each of those sections.

The communicating section 18 has the receiving portion 18a and the transmitting portion 18b.

As an host apparatus of the image forming apparatus 71, the user terminal 13 has: the communicating section 22 for communicating with the server 55 and the image forming apparatus 71 and receiving the image creation data from the server 55; the identification (ID) attribute storing section 23 for storing identification (ID) attribute data showing identification (ID) attributes having the name of the user, the connection address of the terminal, and the like; the temporary storing section 24 for temporarily storing the received image creation data and the like; the attachment processing section 25 for attaching the ID attribute data to the image creation data; the inputting section 27 for allowing the apparatus to execute the input of the user; the printer driver 28 for converting the image creation data and the like received from the server into the data which can be interpreted by the image forming apparatus 71; and the controlling section 26 for controlling each of the above sections.

The communicating section 22 has the receiving portion 22a and the transmitting portion 22b.

The image forming apparatus 71 has: the communicating section 29 for communicating with the user terminal 13 and receiving the image creation data of the image to be formed; a discriminating section 72 for discriminating whether or not a security pattern which is used for suppression of an illegal use of the image creation data or the like is necessary to be formed on a background of the received image creation data; a security pattern forming section 74 for forming security pattern data if it is determined by the discriminating section 72 that the security pattern is necessary; an image forming section 75 for forming the image and the security pattern by printing the image creation data and the security pattern data onto the sheet or the like; the record medium holding section 33 such as a tray for holding the record medium such as a sheet or the like; the ejected record medium holding section 34 for holding the record medium ejected after the image was formed thereon; the temporary storing section 38 for temporarily storing the received data; and a controlling section 76 for controlling each of the above sections.

The discriminating section 72 has a storing section 73 which is used to discriminate about the necessity of the security pattern. A security pattern necessity discrimination table showing a relation between the security rank and the necessity of the security pattern has been stored in the storing section 73.

FIG. 10 is an explanatory diagram showing a construction of the security pattern necessity discrimination table in the embodiment 3.

As shown in FIG. 7, as compared with the embodiment 2, in place of the necessity data "Pattern 1", "Pattern 2", and "Pattern 3", the data "ON" has been stored in the security pattern necessity discrimination table. In place of the "Attribute Designation Range" item, an item of "Print Concentration" is provided.

In correspondence to the item of "Print Concentration", "100%", "70%", and the like have been stored.

As for the print concentration, the print concentration used to form the image creation data is set to a standard concentration and a ratio of a security pattern concentration to the standard concentration is shown. That is, a chromaticity degree (depth of color) of the formed security pattern differs depending on each print concentration.

<Operation of Embodiment 3>

The operation of the image forming system 70 according to the invention will now be described with reference to a flowchart together with the operation of the image forming apparatus according to the invention.

Figure 11:
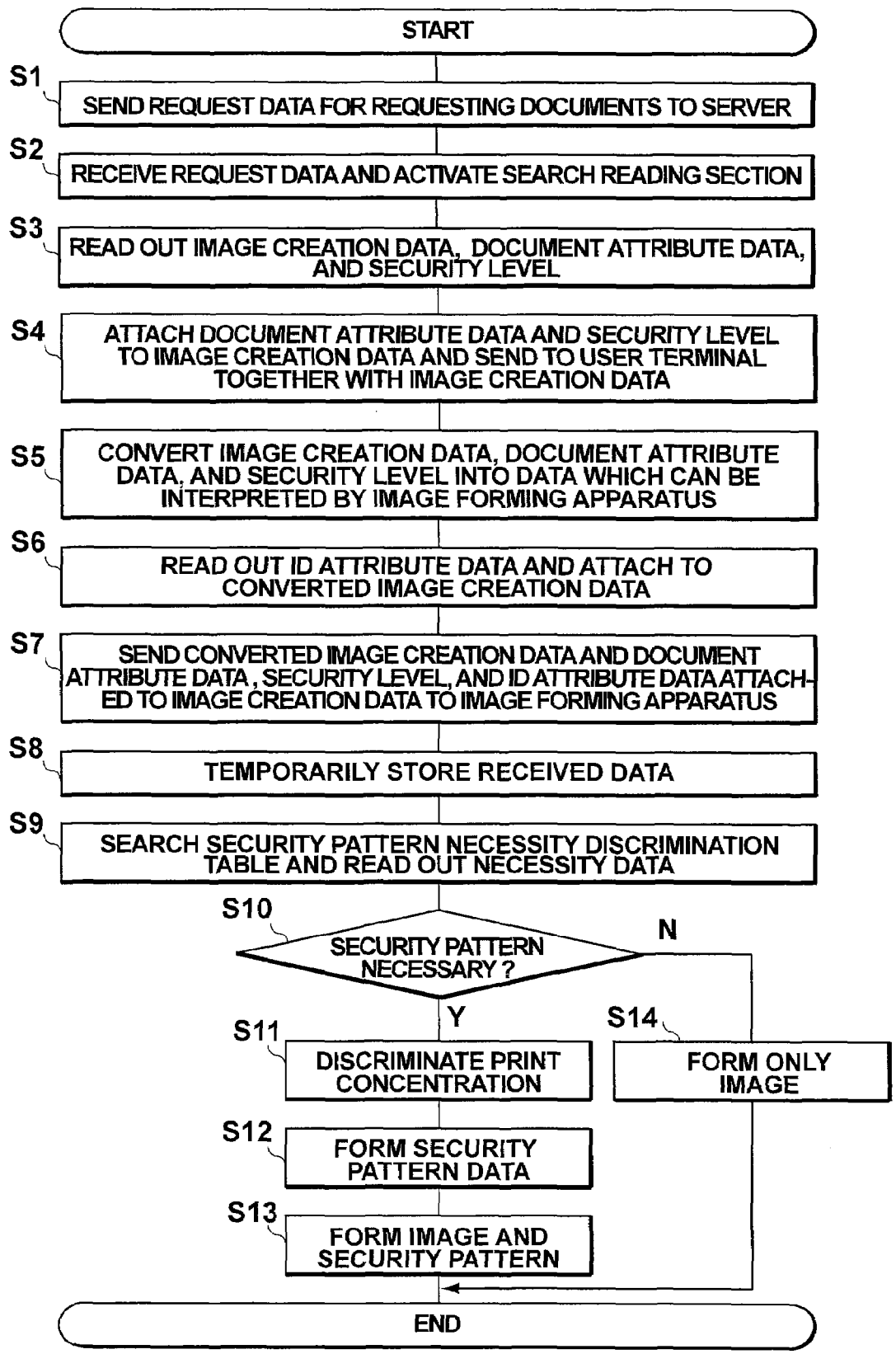
FIG. 11 is a flowchart showing the operation in the embodiment 3 of the image forming system according to the invention.

FIG. 11 is the flowchart showing the operation in the embodiment 3 of the image forming system according to the invention.

First, in the user terminal 13, in response to the input performed by the user through the inputting section 27, the controlling section 26 executes the controlling operation for controlling the whole apparatus and instructs the transmitting portion 22b to transmit request data for requesting the documents to the server 55 (step 1).

In the server 55, the controlling section 59 executes the controlling operation for controlling the whole apparatus, instructs the receiving portion 18a to receive the request data, and activates the searching and reading section 57 (step 2).

On the basis of the document keyword such as "Patent Plan" included in the request data, the searching and reading section 57 searches the "Document Subject" item in the document storing section 56 and reads out the document data 2 as image creation data, the subject data "Patent Plan", proprietor data "Intellectual Property Rights Section", and file name data "patentplan" as document attribute data, and the security rank data "high" indicative of the security level corresponding to those data (step 3).

The document attribute data and the security level are attached to the image creation data by the controlling section 59 and transmitted to the user terminal 13 by the transmitting portion 18b together with the image creation data (step 4).

In the user terminal 13, the image creation data, the document attribute data, and the security level which were received by the receiving portion 22a are temporarily stored into the temporary storing section 24. The printer driver 28 converts those data into the data which can be interpreted by the image forming apparatus 71 (step 5).

The attachment processing section 25 reads out the user name and the terminal connection address as ID attribute data stored in the ID attribute storing section 23 and attaches to the converted image creation data (step 6).

After that, the transmitting portion 22b transmits the converted image creation data and a plurality of document attribute data, security level, and ID attribute data attached to the image creation data to the image forming apparatus 71 (step 7).

The document attribute data and the ID attribute data are used as attribute data showing the attributes regarding the documents.

In the image forming apparatus 71, the controlling section 76 executes the controlling operation for controlling the whole apparatus, instructs the communicating section 29 to receive those data, and instructs the temporary storing section 38 to store those data (step 8).

On the basis of the security level "high" included in those data, the discriminating section 72 searches the security pattern necessity discrimination table in the storing section 73 and reads out the relevant necessity data "ON" (step 9). On the basis of the necessity data "ON", the discriminating section 72 determines that the security pattern is necessary (step 10).

After it was determined that the security pattern is necessary, the discriminating section 72 further reads out the concentration data "100%" in the "Print Concentration" item in correspondence to the "high" data, and sends as a discrimination result to the controlling section 76 (step 11).

The controlling section 76 which received the discrimination result activates the security pattern forming section 74. The activated security pattern forming section 74 forms the security pattern data by using all of the document attribute data and the ID attribute data as attribute data (step 12).

That is, in the embodiment, the similar security pattern data is formed for each security level.

The controlling section 76 conveys the sheet from the record medium holding section 33 to the image forming section 75 and activates the image forming section 75 (step 13). The activated image forming section 75 forms the image and also forms the security pattern as a leakage suppression pattern onto the sheet by using the coloring agent such as toner or the like on the basis of the image creation data and the security pattern data while controlling the concentration of the coloring agent on the basis of the discrimination result (step 13).

In the embodiment, although the print concentration corresponding to the security level "high" is equal to 100%, the print concentration of each of other security levels is less than 100%.

After that, the controlling section 76 conveys the sheet on which the image and the security pattern have been formed to the ejected record medium holding section 34, holds it into the ejected record medium holding section 34, and finishes the processing routine.

If the discriminating section 72 determines in step 10 that the security pattern is unnecessary, the controlling section 76 directly activates the image forming section 75. The activated image forming section 75 forms only the image (step 14).

<Effects of Embodiment 3>

According to the embodiment 3 of the invention, since the print concentration of the security pattern is controlled in accordance with the security level, the consumption amount of the coloring agent can be reduced.

In the foregoing embodiment 2, the security pattern is formed on the basis of the attribute data selected according to the security level and is formed irrespective of the print concentration. In the foregoing embodiment 3, the security pattern is formed according to each security level on the basis of the similar attribute data and is formed at the determined print concentration.

By coupling the constructions of the embodiments 2 and 3, different security pattern data can be formed on the basis of the attribute data selected according to the security level and the security pattern can be formed at the determined print concentration for each security pattern data. Consequently, the consumption amount of the coloring agent can be further reduced.

[Modification Example of Embodiment 3]

In the foregoing embodiment 3, after it was determined that the security pattern is necessary in accordance with the security level on the basis of the necessity data showing whether or not the security pattern is necessary, the print concentration of the security pattern is further discriminated and the security pattern is printed.

However, in place of such a method, it is also possible to construct in such a manner that a predetermined print concentration is preset, each pattern is formed, and the security pattern of a similar concentration is printed without executing the discriminating operation about the print concentration of the security pattern.

In the foregoing embodiment 3, the ratio of the print concentration of the security pattern to the standard concentration (concentration of the toner) when the image creation data is formed has been used as a print concentration of the security pattern. However, in place of such a ratio, a dot density in a print area of the sheet can be used.

The modification example has a construction in which those two points are coupled.

FIG. 17 is an explanatory diagram showing a construction of a security pattern necessity discrimination table in the modification example of the embodiment 3. The security pattern necessity discrimination table has been stored in the storing section 36.

As shown in FIG. 17, in correspondence to the item of the security level, only the item of the necessity discrimination is provided in the security pattern necessity discrimination table. The necessity data such as "Pattern 1", "Pattern 2", "Pattern 3", and the like has been stored. The basic patterns corresponding to those patterns 1 to 3 are shown in FIGS. 18A to 18C.

FIGS. 18A to 18C are explanatory diagrams showing the basic patterns corresponding to the security patterns in the modification example of the embodiment 3.

FIG. 18A shows the basic pattern 1 corresponding to the pattern 1. FIG. 18B shows the basic pattern 2 corresponding to the pattern 2. FIG. 18C shows the basic pattern 3 corresponding to the pattern 3.

The basic pattern 1 corresponds to the security level "high". As shown in FIG. 18A, the dot density to the whole area of the sheet is equal to about 85% and is very high. The basic pattern 2 corresponds to the security level "middle". As shown in FIG. 18B, the dot density to the whole area of the sheet is equal to about 50% and is almost middle. The basic pattern 3 corresponds to the security level "low". As shown in FIG. 18C, the dot density to the whole area of the sheet is equal to about 20% and is relatively low.

In the modification example, the different basic data has previously been stored in the security pattern forming section 74 in correspondence to the basic patterns mentioned above. The discriminating section 72 searches the security pattern necessity discrimination table in the storing section 73 on the basis of, for example, the security level "high" and reads out the necessity data "Pattern 1". Thus, the security pattern forming section 74 reads out the basic data of the basic pattern 1 which has previously been stored and corresponds to the "Pattern 1". For example, the security pattern forming section 74 uses only the user name and corresponding terminal address in the ID attribute data as attribute data, combines those basic data and ID attribute data, and forms the security pattern data of the pattern 1.

That is, in the modification example, the security pattern forming section 74 uses the similar attribute data each time the security pattern data is formed.

According to the modification example, as compared with the embodiment 3, since each security pattern data is formed by combining the similar attribute data with each basic data whose predetermined print concentration (dot density) differs, a similar effect is obtained. Further, the construction of the security pattern necessity discrimination table shown in FIG. 10 can be simplified and the controlling operation can be simplified.

Embodiment 4

An embodiment 4 will now be described.

The same or similar component elements as those in the embodiments 1 to 3 are designated by the same reference numerals and their overlapped explanation is omitted here.

<Construction of Embodiment 4>

FIG. 12 is a block diagram showing a construction in the embodiment 4 of an image forming system according to the invention.

As shown in FIG. 12, an image forming system 80 according to the invention includes: an image forming apparatus 81; the user terminal 13 connected to the image forming apparatus 81 through the communication line 12 so that it can communicate with the image forming apparatus 81; and a server 82 connected to the user terminal 13 through the communication line 14 so that it can communicate with the user terminal 13.

The image forming system 80 is provided for, for example, facilities such as company, bank, or the like and used.

The server 82 has: a document storing section 83 for storing image creation data regarding, for example, each of documents having a security in the facilities; a searching and reading section 84 for searching the document storing section 83 and reading the image creation data; the communicating section 18 for communicating with the user terminal 13; and a controlling section 85 for controlling each of those sections.

FIG. 13 is an explanatory diagram showing a construction of the document storing section in the embodiment 4.

Items of "Document Subject", "Document Contents", "Document Proprietor", "Document File Name", and "Application" have been provided in the document storing section 83.

In correspondence to the item of "Application", "Public System" and "Word Processor" have been stored as security levels.

The image forming apparatus 81 has: the communicating section 29 for communicating with the user terminal 13 and receiving the image creation data of the image to be formed; a discriminating section 86 for discriminating whether or not a security pattern which is used for suppression of an illegal use of the image creation data or the like is necessary to be formed on a background of the received image creation data; a security pattern forming section 88 for forming security pattern data if it is determined by the discriminating section 86 that the security pattern is necessary; an image forming section 89 for forming the image and the security pattern by printing the image creation data and the security pattern data onto the sheet or the like; the record medium holding section 33 such as a tray for holding the record medium such as a sheet or the like; the ejected record medium holding section 34 for holding the record medium ejected after the image was formed thereon; the temporary storing section 38 for temporarily storing the received data; and a controlling section 90 for controlling each of the above sections.

The discriminating section 86 has a storing section 87 which is used to discriminate about the necessity of the security pattern. A security pattern necessity discrimination table showing a relation between the security rank and the necessity about the security pattern has been stored in the storing section 87.

FIG. 14 is an explanatory diagram showing a construction of the security pattern necessity discrimination table in the embodiment 4.

As shown in FIG. 14, items of "Application (security level)", "Necessity Discrimination", and "Print Concentration" have been provided in the security pattern necessity discrimination table.

In correspondence to each item, item data such as "Word Processor", "Pattern 1", "100%", and the like have been stored.

<Operation of Embodiment 4>

The operation of the image forming system 80 according to the invention will now be described with reference to a flowchart together with the operation of the image forming apparatus according to the invention.

Figure 15:
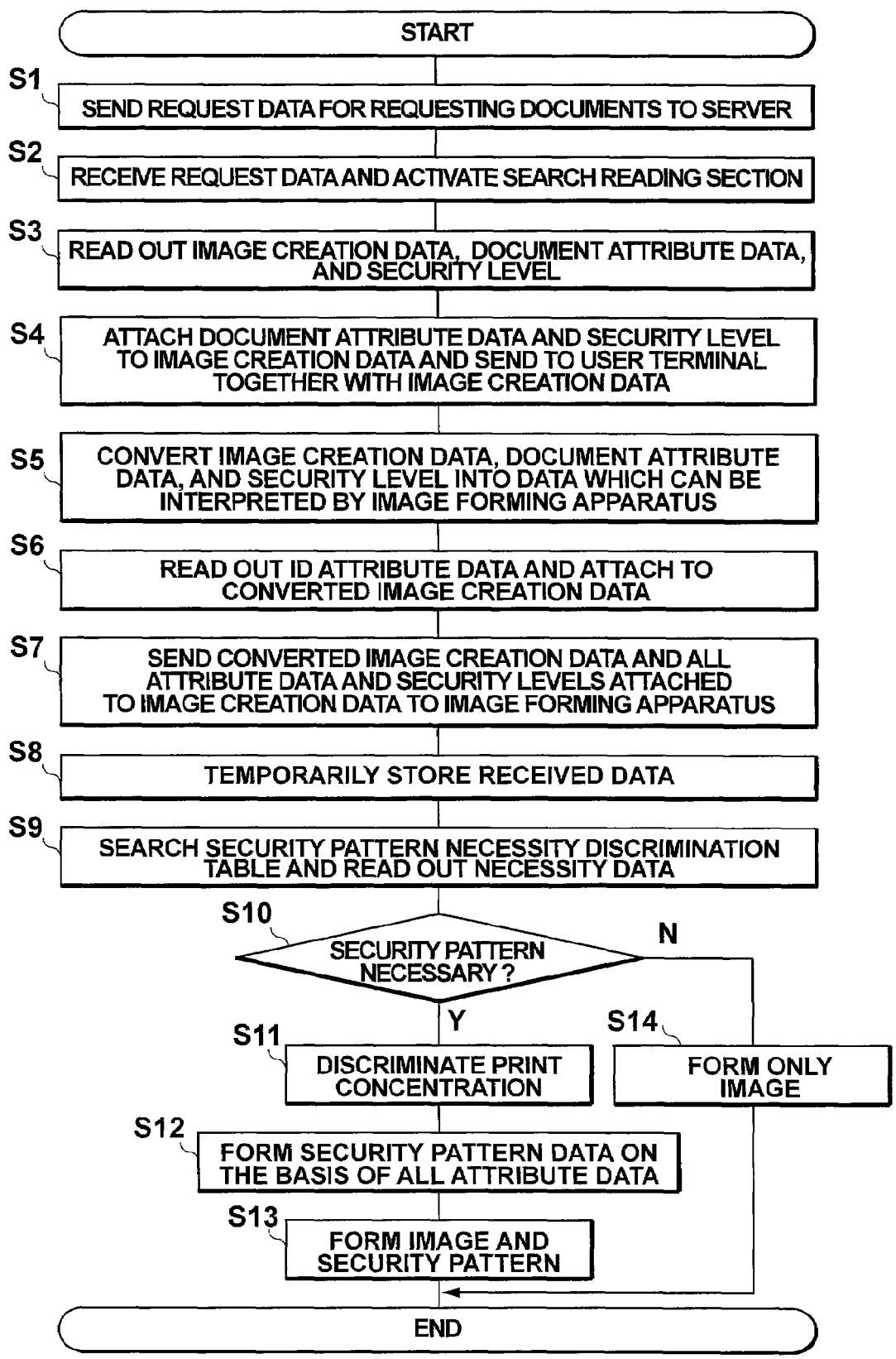
FIG. 15 is a flowchart showing the operation in the embodiment 4 of the image forming system according to the invention.

FIG. 15 is the flowchart showing the operation in the embodiment 4 of the image forming system according to the invention.

First, in the user terminal 13, in response to the input performed by the user through the inputting section 27, the controlling section 26 executes the controlling operation for controlling the whole apparatus and instructs the transmitting portion 22b to transmit request data for requesting the documents to the server 82 (step 1).

In the server 82, the controlling section 85 executes the controlling operation for controlling the whole apparatus, instructs the receiving portion 18a to receive the request data, and activates the searching and reading section 84 (step 2).

On the basis of the document keyword such as "Patent Plan" included in the request data, the searching and reading section 84 searches the "Document Subject" item in the document storing section 83 and reads out the document data 2, the subject data "Patent Plan" as document attribute data, proprietor data "Intellectual Property Rights Section", and file name data "patentplan" as image creation data, and the application name "Word Processor" indicative of the security level corresponding to those data (step 3).

In the embodiment, the security level has been allocated according to each application software.

The document attribute data and the security level are attached to the image creation data by the controlling section 85 and transmitted to the user terminal 13 by the transmitting portion 18b together with the image creation data (step 4).

In the user terminal 13, the image creation data, the document attribute data, and the security level which were received by the receiving portion 22a are temporarily stored into the temporary storing section 24. The printer driver 28 converts those data into the data which can be interpreted by the image forming apparatus 81 (step 5).

The attachment processing section 25 reads out the user name and the terminal connection address as ID attribute data stored in the ID attribute storing section 23 and attaches to the converted image creation data (step 6).

After that, the transmitting portion 22b transmits the converted image creation data and a plurality of document attribute data, security level, and ID attribute data attached to the image creation data to the image forming apparatus 81 (step 7).

In the image forming apparatus 81, the controlling section 90 executes the controlling operation for controlling the whole apparatus, instructs the communicating section 29 to receive those data, and instructs the temporary storing section 38 to store those data (step 8).

On the basis of the security level, that is, the application name "Word Processor" included in those data, the discriminating section 86 searches the security pattern necessity discrimination table in the storing section 87 and reads out the relevant necessity data "Pattern 1" (step 9). On the basis of the read-out necessity data "Pattern 1", the discriminating section 86 determines that the security pattern is necessary (step 10).

After it was determined that the security pattern is necessary, the discriminating section 86 further reads out the concentration data "100%" in the "Print Concentration" item in correspondence to the "Pattern 1" data, and sends as a discrimination result to the controlling section 90 (step 11).

The controlling section 90 which received the discrimination result activates the security pattern forming section 88. The activated security pattern forming section 88 forms the security pattern data by using all of the document attribute data and the ID attribute data as attribute data (step 12).

The controlling section 90 conveys the sheet from the record medium holding section 33 to the image forming section 89 and activates the image forming section 89 (step 13). The activated image forming section 89 forms the image and also forms the security pattern as a leakage suppression pattern onto the sheet by using the coloring agent such as toner or the like on the basis of the image creation data and the security pattern data while controlling the concentration of the coloring agent on the basis of the discrimination result (step 13).

In the embodiment, although the print concentration of the pattern 1 is equal to 100%, the print concentration of each of other patterns is less than 100%.

Therefore, the consumption amount of the coloring agent can be reduced as necessary.

After that, the controlling section 90 conveys the sheet on which the image and the security pattern have been formed to the ejected record medium holding section 34, holds it into the ejected record medium holding section 34, and finishes the processing routine.

If the discriminating section 86 determines in step 10 that the security pattern is unnecessary, the controlling section 90 directly activates the image forming section 89. The activated image forming section 89 forms only the image (step 14).

<Effects of Embodiment 4>

According to the embodiment 4 of the invention, since the application name is used as a security level, the consumption amount of the coloring agent can be reduced and applicability of the invention can be improved.

[Modification Example of Embodiment 4>

Although either the security rank or the application name has been used as a security level in the foregoing embodiment 4, in place of it, for example, both of the security rank and the application name can be used. In this case, for example, the order of the security levels can be discriminated by using the priority.

FIG. 16 is an explanatory diagram showing a construction of a security pattern necessity discrimination table in a modification example of the embodiment 4 of the image forming system according to the invention.

As shown in FIG. 16, in correspondence to the item of "Security Level", both of the security rank and the application name are used and have been stored in the security pattern necessity discrimination table in the modification example. Items of "Priority" and "Necessity Discrimination" have been provided in the security pattern necessity discrimination table.

Therefore, in the image forming apparatus, if both of the security rank and the application name exist in the data transmitted through the user terminal, priority data corresponding to the "Priority" item is discriminated by the discriminating section. Thus, a pattern used to form the security pattern can be discriminated in correspondence to the "Necessity Discrimination" item.

The consumption amount of the coloring agent can be reduced.

Embodiment 5

An embodiment 5 will now be described.

The same or similar component elements as those in the embodiments 1 to 3 are designated by the same reference numerals and their overlapped explanation is omitted here.

<Construction of Embodiment 5>

Figure 19:
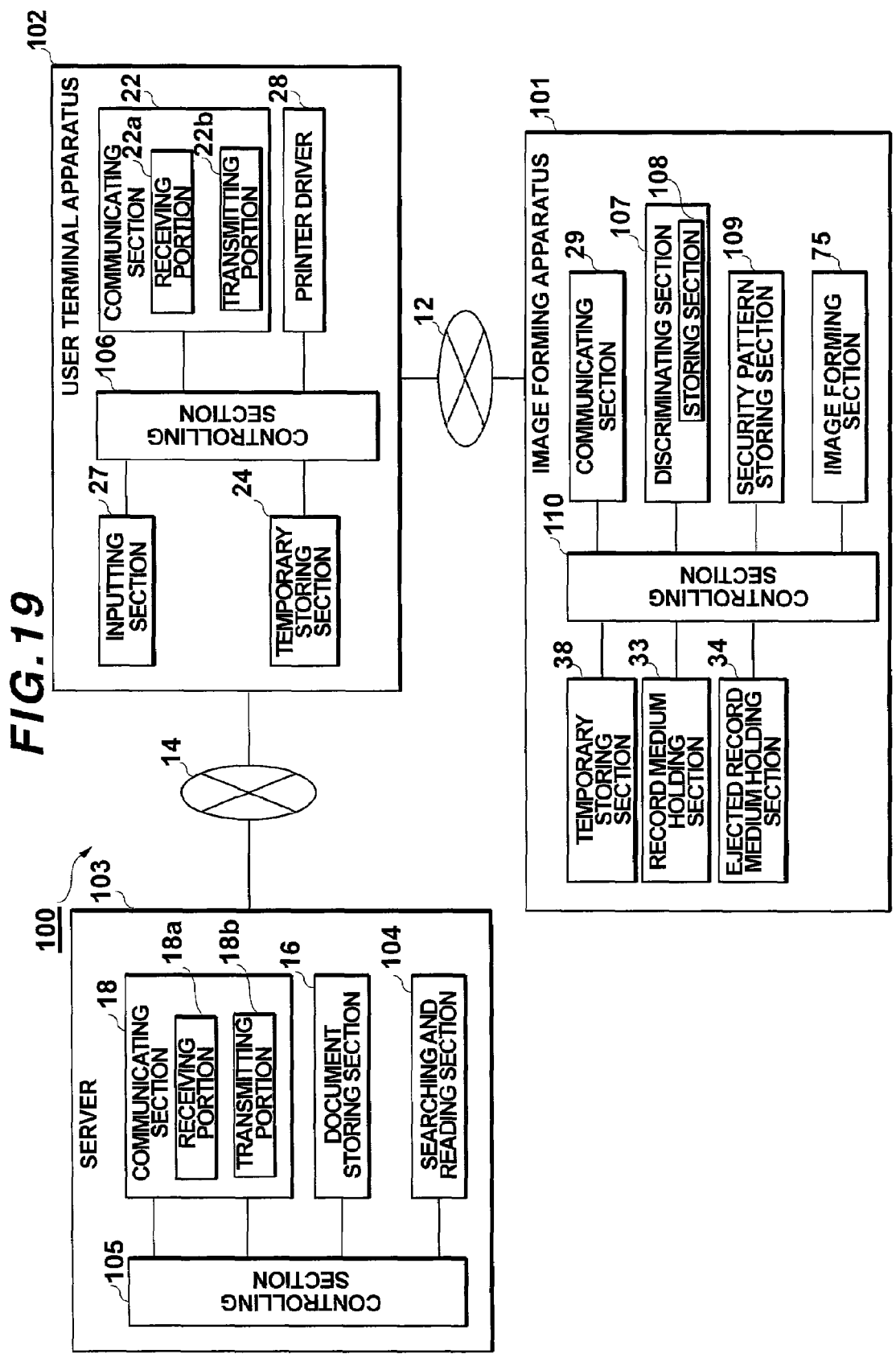
FIG. 19 is a block diagram showing a construction in an embodiment 5 of an image forming system according to the invention.

FIG. 19 is a block diagram showing a construction in the embodiment 5 of an image forming system according to the invention.

As shown in FIG. 19, an image forming system 100 according to the invention includes: an image forming apparatus 101; a user terminal 102 connected to the image forming apparatus 101 through the communication line 12 so that it can communicate with the image forming apparatus 101; and a server 103 connected to the user terminal 102 through the communication line 14 so that it can communicate with the user terminal 102.

The server 103 has: the document storing section 16 (embodiment 1) for storing the image creation data regarding, for example, each of documents having a security in the facilities; a searching and reading section 104 for searching the document storing section 16 and reading the image creation data; the communicating section 18 for communicating with the user terminal 102; and a controlling section 105 for controlling each of those sections.

The communicating section 18 has the receiving portion 18*a* and the transmitting portion 18*b*.

As an host apparatus of the image forming apparatus 101, the user terminal 102 has: the communicating section 22 for communicating with the server 103 and the image forming apparatus 101, respectively, and receiving the image creation data from the server 103; the temporary storing section 24 for temporarily storing the received image creation data and the like; the inputting section 27 for allowing the apparatus to execute the input of the user; the printer driver 28 for converting the image creation data and the like received from the server into data which can be interpreted by the image forming apparatus 101; and a controlling section 106 for controlling each of the above sections.

The communicating section 22 has the receiving portion 22*a* and the transmitting portion 22*b*.

The image forming apparatus 101 has: the communicating section 29 for communicating with the user terminal 102 and receiving the image creation data of the image to be formed; a discriminating section 107 for discriminating whether or not a security pattern which is used for suppression of an illegal use of the image creation data or the like is necessary to be formed on a background of the received image creation data; a security pattern storing section 109 for storing each pattern of the security patterns; the image forming section 75 for forming the image and the security pattern by printing the image creation data and the security pattern data onto the sheet or the like; the record medium holding section 33 such as a tray for holding the record medium such as a sheet or the like; the ejected record medium holding section 34 for holding the record medium ejected after the image was formed thereon; the temporary storing section 38 for temporarily storing the received data; and a controlling section 110 for controlling each of the above sections.

The discriminating section 107 has a storing section 108 which is used to discriminate about the necessity of the security pattern. A security pattern necessity discrimination table showing a relation between the security rank and the necessity of the security pattern has been stored in the storing section 108.

FIG. 20 is an explanatory diagram showing a construction of the security pattern necessity discrimination table in the embodiment 5.

As shown in FIG. 20, in correspondence to the security level data "high" and the like, their necessity data "Pattern 1", "Pattern 2", "Pattern 3", and the like have been stored in the security pattern necessity discrimination table.

Figure 21C:
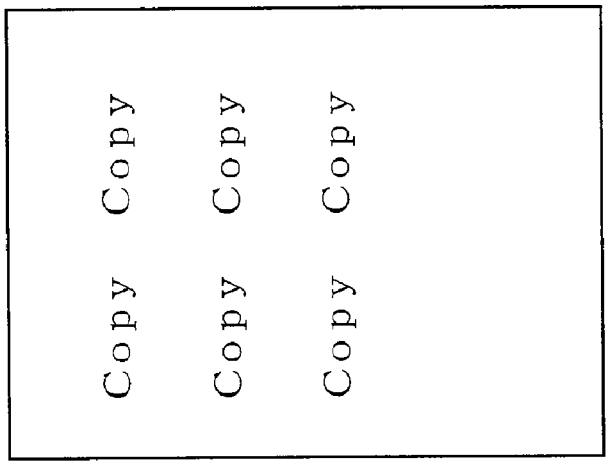
FIGS. 21A to 21C are explanatory diagrams showing patterns stored in a security pattern storing section in the embodiment 5.
Figure 21B:
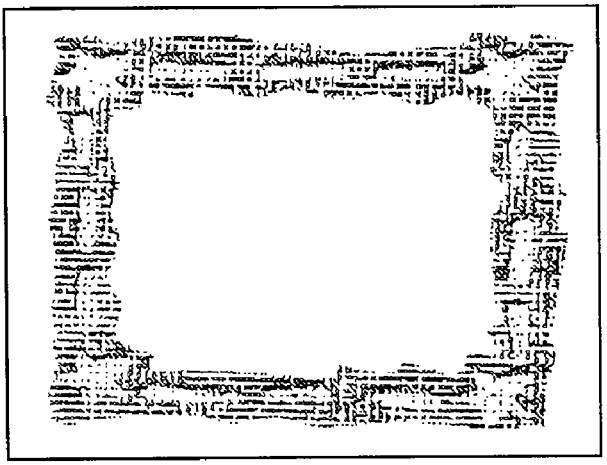
Figure 21A:
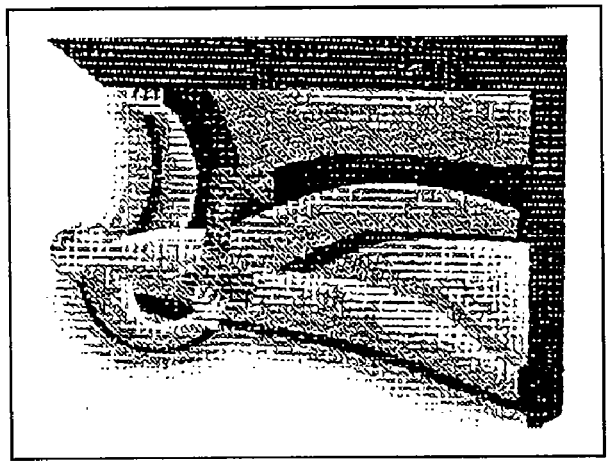

FIGS. 21A to 21C are explanatory diagrams showing the patterns stored in the security pattern storing section in the embodiment 5.

FIG. 21A illustrates the pattern 1. FIG. 21B illustrates the pattern 2. FIG. 21C illustrates the pattern 3.

The pattern 1 corresponds to the security level "high".

As shown in FIG. 21A, the dot density to the whole area of the sheet is equal to about 85% and is very high. The pattern 2 corresponds to the security level "middle". As shown in FIG. 21B, the dot density to the whole area of the sheet is equal to about 50% and is almost middle. The pattern 3 corresponds to the security level "low". As shown in FIG. 21C, the dot density to the whole area of the sheet is equal to about 20% and is relatively low.

The security pattern data corresponding to those patterns have previously been stored in the security pattern storing section 109.

<Operation of Embodiment 5>

The operation of the image forming system 100 according to the invention will now be described with reference to a flowchart together with the operation of the image forming apparatus according to the invention.

Figure 22:
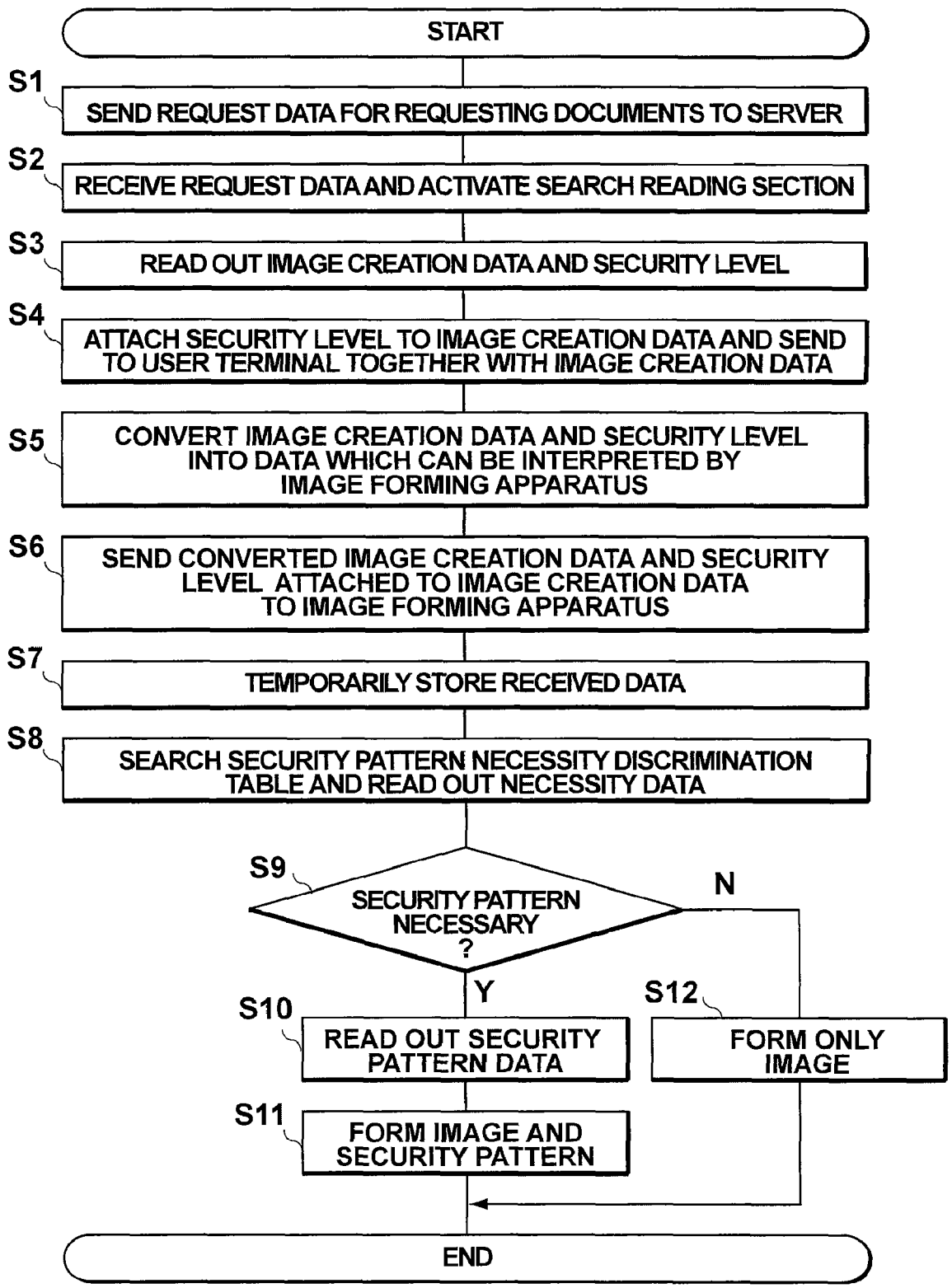
FIG. 22 is a flowchart showing the operation in the embodiment 5 of the image forming system according to the invention.

FIG. 22 is the flowchart showing the operation in the embodiment 5 of the image forming system according to the invention.

First, in the user terminal 102, in response to the input performed by the user through the inputting section 27, the controlling section 106 executes the controlling operation for controlling the whole apparatus and instructs the transmitting portion 22*b* to transmit request data for requesting the documents to the server 103 (step 1).

In the server 103, the controlling section 105 executes the controlling operation for controlling the whole apparatus, instructs the receiving portion 18*a* to receive the request data, and activates the searching and reading section 104 (step 2).

On the basis of the document keyword such as "Patent Plan" included in the request data, the searching and reading section 104 searches the "Document Subject" item in the document storing section 16 and reads out the document data 2 as image creation data and the security rank data "high" as a security level corresponding thereto (step 3).

The security level is attached to the image creation data by the controlling section 105 and transmitted to the user terminal 102 by the transmitting portion 18*b* together with the image creation data (step 4).

In the user terminal 102, the image creation data and the security level which were received by the receiving portion 22*a* are temporarily stored into the temporary storing section 24. The printer driver 28 converts those data into the data which can be interpreted by the image forming apparatus 101 (step 5).

After that, the transmitting portion 22b transmits the converted image creation data and the security level attached to the image creation data to the image forming apparatus 101 (step 6).

In the image forming apparatus 101, the controlling section 110 executes the controlling operation for controlling the whole apparatus, instructs the communicating section 29 to receive those data, and instructs the temporary storing section 38 to store those data (step 7).

On the basis of the security level, for example, "high" included in those data, the discriminating section 107 searches the security pattern necessity discrimination table in the storing section 108 and reads out the relevant necessity data "Pattern 1" (step 8). On the basis of the read-out necessity data "Pattern 1", the discriminating section 107 determines that the security pattern is necessary (step 9).

After it was determined that the security pattern is necessary, as a reading section, the controlling section 110 reads out the security pattern data corresponding to the "Pattern 1" from the security pattern storing section 109 (step 10).

The controlling section 110 conveys the sheet from the record medium holding section 33 to the image forming section 75 and activates the image forming section 75 (step 11). The activated image forming section 75 forms the image onto the sheet and also forms the security pattern shown in FIG. 21A as a leakage suppression pattern on the basis of the image creation data (step 11).

After that, the controlling section 110 conveys the sheet on which the image and the security pattern have been formed to the ejected record medium holding section 34, holds it into the ejected record medium holding section 34, and finishes the processing routine.

If the discriminating section 107 determines in step 9 that the security pattern is unnecessary, the controlling section 110 directly activates the image forming section 75. The activated image forming section 75 forms only the image (step 12).

<Effects of Embodiment 5>

According to the embodiment 5 of the invention, since the security pattern data of the different print concentration constructed by the dot density is previously stored and the security pattern of the small dot density is formed according to the low security level, the consumption amount of the coloring agent can be reduced by the simple control.

Embodiment 6

An embodiment 6 will now be described.

The same or similar component elements as those in the embodiments 1 to 5 are designated by the same reference numerals and their overlapped explanation is omitted here.

<Construction of Embodiment 6>

Figure 23:
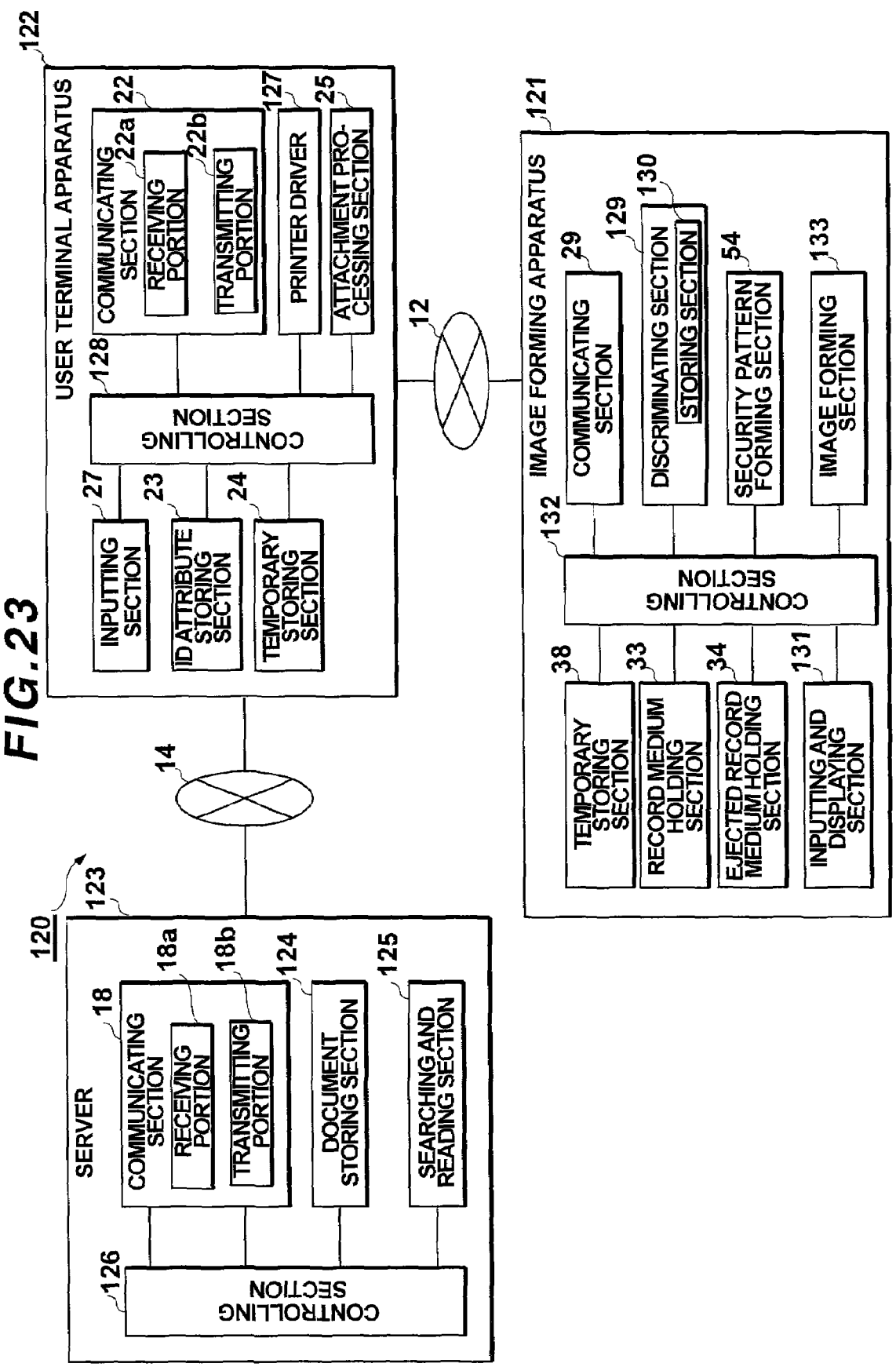
FIG. 23 is a block diagram showing a construction in an embodiment 6 of an image forming system according to the invention.

FIG. 23 is a block diagram showing a construction in the embodiment 6 of an image forming system according to the invention.

As shown in FIG. 23, an image forming system 120 according to the invention includes: an image forming apparatus 121; a user terminal 122 connected to the image forming apparatus 121 through the communication line 12 so that it can communicate with the image forming apparatus 121; and a server 123 connected to the user terminal 122 through the communication line 14 so that it can communicate with the user terminal 122.

The image forming system 120 is provided for, for example, facilities such as company, bank, or the like and used.

The server 123 has: a document storing section 124 for storing the image creation data regarding, for example, each of documents in the facilities; a searching and reading section 125 for searching the document storing section 124 and reading the relevant image creation data; the communicating section 18 for communicating with the user terminal 122; and a controlling section 126 for controlling each of those sections.

The communicating section 18 has the receiving portion 18a and the transmitting portion 18b.

FIG. 24 is an explanatory diagram showing a construction of the document storing section in the embodiment 6.

Items of "Document Subject", "Document Contents", "Document Proprietor", and "Document File Name" have been provided in the document storing section 124.

As an host apparatus of the image forming apparatus 121, the user terminal 122 has: the communicating section 22 for communicating with the server 123 and the image forming apparatus 121, respectively, and receiving the image creation data from the server 123; the attribute storing section 23 for storing the ID attribute data showing the identification (ID) attributes having the user name, the connection address of the terminal, and the like; the temporary storing section 24 for temporarily storing the received image creation data and the like; the attachment processing section 25 for attaching the ID attribute data to the image creation data; the inputting section 27 for allowing the apparatus to execute the input of the user; a printer driver 127 for converting the image creation data and the like received from the server into data which can be interpreted by the image forming apparatus 121; and a controlling section 128 for controlling each of the above sections.

The communicating section 22 has the receiving portion 22a and the transmitting portion 22b.

The image forming apparatus 121 has: the communicating section 29 for communicating with the user terminal 122 and receiving the image creation data of the image to be formed; an inputting and displaying section 131 for allowing the user to set whether or not the security level is set to the received image creation data; a discriminating section 129 for discriminating a security pattern forming data, a corresponding print concentration, and the like to form the security pattern on the basis of data of the security level in the case where the security level has been set by the inputting and displaying section 131; the security pattern forming section 54 for forming the security pattern data on the basis of the security pattern forming data determined by the discriminating section 129; an image forming section 133 for forming the image and the security pattern by printing the image creation data and the security pattern data onto the sheet or the like; the record medium holding section 33 such as a tray for holding the record medium such as a sheet or the like; the ejected record medium holding section 34 for holding the record medium ejected after the image was formed thereon; the temporary storing section 38 for temporarily storing the received data; and a controlling section 132 for controlling each of the above sections.

The inputting and displaying section 131 is constructed by, for example, an operation panel. The inputting and displaying section 131 is used for displaying an inquiry display screen for the setting of the security level and allowing the user to input.

The discriminating section 129 has a storing section 130. A data table to form a security pattern (hereinafter, also referred to as a security pattern forming data table) showing a relation among the security level, the data to form the security pattern (hereinafter, also referred to as security pattern forming data), and the print concentration has been stored in the storing section 130.

FIG. 25 is an explanatory diagram showing a construction of the security pattern forming data table in the embodiment 6.

As shown in FIG. 25, items of "Security Level", "Attribute Designation Range", and "Print Concentration" have been provided in the security pattern forming data table.

In correspondence to the "Security Level" item, "High", "Middle", "Low", and "Copy Prohibition" have been stored.

In correspondence to the "Attribute Designation Range" item, subitems of "User Name", "Terminal Connection Address", "Document Subject", "Document Proprietor", and "Document File Name" are provided. In correspondence to those subitems, data of "Yes" or "No" has been stored.

In correspondence to the "Print Concentration" item, "90%", "75%", "50%", and "25%" have been stored. As mentioned above, the print concentration indicates the chromaticity degree of the toner when the security pattern is formed. The print concentration indicates the ratio of the concentration to the depth of toner used when the image creation data is formed.

The security pattern forming section 54 uses the attribute data which has been determined to be "Yes" by the discriminating section 129 as security pattern forming data and forms the security pattern data. In this case, the security pattern data of the dot pattern can be formed by the Val-Code technique as a digital watermark technique.

The image forming section 133 forms the security pattern according to the print concentration determined by the discriminating section 129.

<Operation of Embodiment 6>

The operation of the image forming system 120 according to the invention will now be described with reference to a flowchart together with the operation of the image forming apparatus according to the invention.

Figure 26:
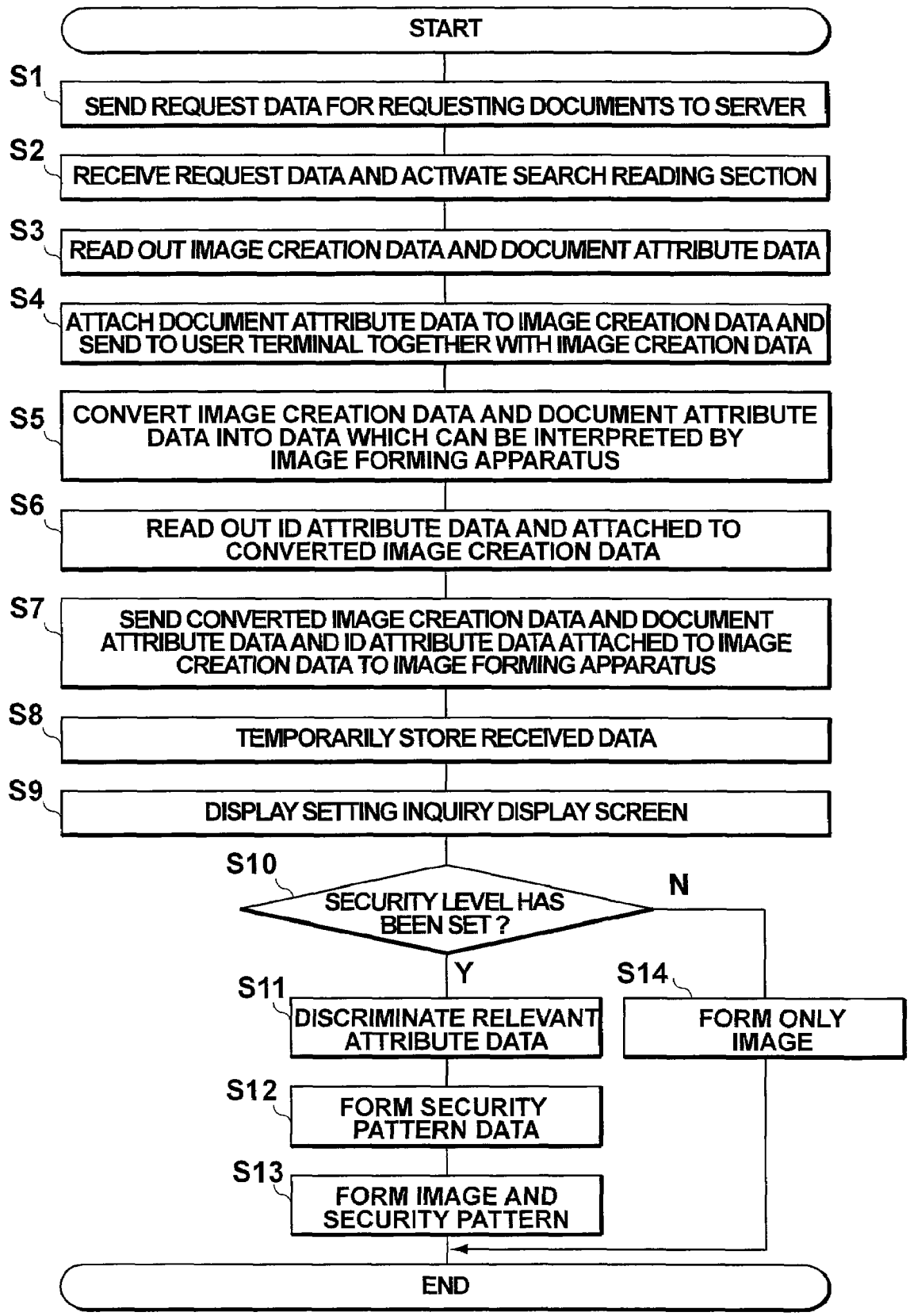
FIG. 26 is a flowchart showing the operation in the embodiment 6 of the image forming system according to the invention.

FIG. 26 is the flowchart showing the operation in the embodiment 6 of the image forming system according to the invention.

First, in the user terminal 122, in response to the input performed by the user through the inputting section 27, the controlling section 128 executes the controlling operation for controlling the whole apparatus and instructs the transmitting portion 22b to transmit request data for requesting the documents to the server 123 (step 1).

In the server 123, the controlling section 126 executes the controlling operation for controlling the whole apparatus, instructs the receiving portion 18a to receive the request data, and activates the searching and reading section 125 (step 2).

On the basis of the document keyword such as "Patent Plan" included in the request data, the searching and reading section 125 searches the "Document Subject" item in the document storing section 124 and reads out the document data 2 as image creation data and the subject data "Patent Plan", proprietor data "Intellectual Property Rights Section", and file name data "patentplan" as document attribute data (step 3). The document attribute data is attached to the image creation data by the controlling section 126 and transmitted to the user terminal 122 by the transmitting portion 18b together with the image creation data (step 4).

In the user terminal 122, the image creation data and the document attribute data which were received by the receiving portion 22a are temporarily stored into the temporary storing section 24. The printer driver 127 converts those data into the data which can be interpreted by the image forming apparatus 121 (step 5).

The attachment processing section 25 reads out the user name and the terminal connection address as ID attribute data stored in the ID attribute storing section 23 and attaches to the converted image creation data (step 6).

After that, the transmitting portion 22b transmits the converted image creation data and a plurality of document attribute data and ID attribute data attached to the image creation data to the image forming apparatus 121 (step 7).

The document attribute data and the ID attribute data are used as attribute data showing the attributes regarding the documents.

In the image forming apparatus 121, the controlling section 132 executes the controlling operation for controlling the whole apparatus, instructs the communicating section 29 to receive those data, and instructs the temporary storing section 38 to store those data (step 8).

Subsequently, the inputting and displaying section 131 displays a setting inquiry display screen of the security level for the image creation data and allows the user to execute the setting operation (step 9).

FIGS. 27A and 27B are explanatory diagrams showing the setting inquiry display screen of the security level in the embodiment 6. FIG. 27A illustrates the inquiry display screen. FIG. 27B illustrates the setting display screen.

For the setting of the security pattern, "ON" and "OFF" are displayed on the inquiry display screen shown in FIG. 27A. If the user selects "ON", the setting display screen shown in FIG. 27B is displayed. The security levels (Security Level) of four ranks of "High", "Middle", "Low", and "Copy Prohibition" are shown on the setting display screen. The user can select one of them.

In the embodiment, it is assumed that the user has selected the security level of "High".

The controlling section 132 monitors an output from the inputting and displaying section 131 and discriminates whether or not the security level has been set (step 10).

If the security level of "High" is selected, the controlling section 132 activates the discriminating section 129, searches the security pattern forming data table in the storing section 130 on the basis of the selected security level "High", and instructs the discriminating section 129 to discriminate the relevant attribute data and the print concentration (step 11). That is, the attribute data corresponding to the "Yes" data is determined as security pattern forming data.

After the security pattern forming data was determined, the controlling section 132 activates the security pattern forming section 54. The activated security pattern forming section 54 selectively uses the document attribute data and ID attribute data as attribute data on the basis of a discrimination result from the discriminating section 129 and forms the security pattern data (step 12). In the embodiment, since the security level is "High" and all of the attribute data corresponds to "Yes", the security pattern forming section 54 selects all of the attribute data.

Although all of the attribute data is selected in correspondence to "High" in the embodiment, a part of the attribute data is selected in correspondence to another security level.

The controlling section 132 conveys the sheet from the record medium holding section 33 to the image forming section 133 and activates the image forming section 133 (step 13). The activated image forming section 133 forms the image corresponding to the image creation data by using the coloring agent such as toner or the like on the basis of the print concentration "90%" determined by the discriminating section 129 and forms the security pattern corresponding to the security pattern data as a leakage suppression pattern while controlling the concentration of the coloring agent (step 13).

The controlling section 132 conveys the sheet on which the image and the security pattern have been formed to the ejected record medium holding section 34, holds it into the ejected record medium holding section 34, and finishes the processing routine.

If it is determined in step 10 that there is no setting of the security level, the controlling section 132 directly activates the image forming section 133. The activated image forming section 133 forms only the image (step 14).

If the security level is "Copy Prohibition", the discriminating section 129 determines that the data to be used as security pattern data is the "Copy Prohibition" data. The security pattern forming section 54 forms the security pattern data on the basis of the "Copy Prohibition" data. The image forming section 133 forms the copy suppression hidden pattern for suppressing the copy of the image creation data.

In the above embodiment 6, in the image forming apparatus 121, after the communicating section 29 received the image creation data and the like from the user terminal 122, the setting inquiry display screen of the security level is displayed so as to allow the user to set the security level. However, in place of such a construction, it is also possible to construct in such a manner that before the communicating section 29 receives the image creation data and the like from the user terminal 122, the setting inquiry display screen of the security level is displayed so as to allow the user to set the security level.

In this case, the security level can be set by only one operation for a plurality of continuous printing operations having similar security levels without setting the security level every printing.

In the case where a plurality of image forming apparatuses are connected to the user terminal and used, by displaying the setting inquiry display screen of the security level to each of the image forming apparatuses and allowing the user to preset the security level, each security level can be made to correspond to each image forming apparatus. Therefore, a troublesomeness regarding the settings of the security level can be further reduced.

<Effects of Embodiment 6>

According to the embodiment 6 of the invention, the inputting and displaying section is provided for the image forming apparatus, the setting inquiry display screen of the security level is displayed to the inputting and displaying section so as to allow the user to set the security level, the security pattern data is formed according to the set security level, and the security pattern is formed at the predetermined print concentration. Therefore, the security level can be set just before the image is formed. The consumption amount of the coloring agent can be reduced.

That is, since the foregoing embodiment relates to the example in which the print concentration and the attribute designation range are combined and used, the consumption amount of the coloring agent can be further reduced.

The image forming apparatus is constructed by one of a printer, a copying apparatus, a hybrid apparatus, and the like.

A watermark, a transparency print, and the like are also included in the security patterns.

It should be understood by those skilled in the art that various modification examples, combinations, sub-combinations and alterations may occur depending on design requirements and other factors insofar as they are within the scope of the appended claims or the equivalents thereof.

What is claimed is:

1. An image forming apparatus for overlaying woven pattern data to document data received from a host apparatus and printing, comprising:
    a woven information table having pre-stored woven information corresponding to respective characteristic information of document data;
    a discriminating section configured to discriminate characteristic information of the received document data;
    a selecting section configured to select the woven pattern data, on the basis of the characteristic information and the woven information table, for overlaying on the received document data to print; and
    a print controlling section which overlays the selected data and said document data to print.

2. The image forming apparatus according to claim 1, wherein said selecting section selects the woven pattern data of a different print density on the basis of the characteristic information.

3. The image forming apparatus according to claim 1, wherein said selecting section selects the woven pattern data of a different concentration on the basis of the characteristic information.

4. The image forming apparatus according to claim 1, wherein said characteristic information includes information showing a security level of said document data.

5. An image forming system having a host apparatus for transmitting document data and an image forming apparatus for overlaying woven pattern data to the document data received from said host apparatus and printing, comprising:
    a woven information table having pre-stored woven information corresponding to respective characteristic information of document data;
    a discriminating section configured to discriminate characteristic information of the received document data;
    a selecting section configured to select the woven pattern data on the basis of the characteristic information and the woven information table; and
    a print controlling section which overlays the selected woven pattern data and said document data and prints.

6. The image forming system according to claim 5, wherein said characteristic information includes information showing a security level of said document data.

7. The image forming system according to claim 5, wherein said selecting section selects the woven pattern data of a different concentration on the basis of the characteristic information.

8. The image forming system according to claim 5, wherein said selecting section selects the woven pattern data of a different print density on the basis of the characteristic information.

* * * * *